(12) United States Patent
Shimizu

(10) Patent No.: US 10,382,349 B2
(45) Date of Patent: Aug. 13, 2019

(54) SERVER FOR DISTRIBUTED CONTROLLER SYSTEM

(71) Applicant: FUJITSU LIMITED, Kawasaki-shi, Kanagawa (JP)

(72) Inventor: Sho Shimizu, San Jose, CA (US)

(73) Assignee: FUJITSU LIMITED, Kakasaki (JP)

( * ) Notice: Subject to any disclaimer, the term of this patent is extended or adjusted under 35 U.S.C. 154(b) by 156 days.

(21) Appl. No.: 14/628,793

(22) Filed: Feb. 23, 2015

(65) Prior Publication Data
US 2015/0244782 A1 Aug. 27, 2015

(30) Foreign Application Priority Data

Feb. 26, 2014 (JP) .................................. 2014-036075

(51) Int. Cl.
*H04L 12/863* (2013.01)
(52) U.S. Cl.
CPC .................................. *H04L 47/621* (2013.01)
(58) Field of Classification Search
CPC .... H04L 4/621; H04L 47/6215; H04L 47/622
See application file for complete search history.

(56) References Cited

U.S. PATENT DOCUMENTS

| | | | | |
|---|---|---|---|---|
| 5,179,556 A * | 1/1993 | Turner | ..................... | H04J 3/247 370/233 |
| 5,594,924 A * | 1/1997 | Ottesen | ................... | G11B 5/012 348/E7.073 |
| 6,289,021 B1 * | 9/2001 | Hesse | .................. | H04L 12/5601 370/400 |
| 6,484,207 B1 * | 11/2002 | Petersen | .................. | H04L 12/44 709/232 |
| 6,778,536 B1 * | 8/2004 | Ofek | .................... | H04L 12/5693 370/395.4 |
| 7,088,710 B1 * | 8/2006 | Johnson | .................. | H04L 12/64 370/357 |
| 7,222,367 B2 * | 5/2007 | Behr | ..................... | G06F 21/105 380/201 |
| 2004/0083326 A1 * | 4/2004 | Wang | .................. | G06F 13/4022 710/317 |
| 2004/0090964 A1 * | 5/2004 | Reed | .................... | H04L 49/1523 370/395.4 |
| 2008/0100368 A1 * | 5/2008 | Ryu | ..................... | H04L 25/4906 327/513 |

FOREIGN PATENT DOCUMENTS

JP 07-200494 8/1995

* cited by examiner

*Primary Examiner* — Esther B. Henderson
(74) *Attorney, Agent, or Firm* — Fujitsu Patent Center

(57) ABSTRACT

A server is provided in a network system that controllers control switches based on information given from an application. The server includes queues, each of which is associated with the switches, to store information given from the application directed to the associated switch, a receiver to receive, from each controller, destination information including queue designating information and information for transmitting information read from the queue designated by the queue designating information to one of the controllers being a destination of the read information, and a transmitter to transmit the information read from each of the queues to one of the controllers to control at least one of the switches associated with each of the queues based on the destination information.

1 Claim, 31 Drawing Sheets

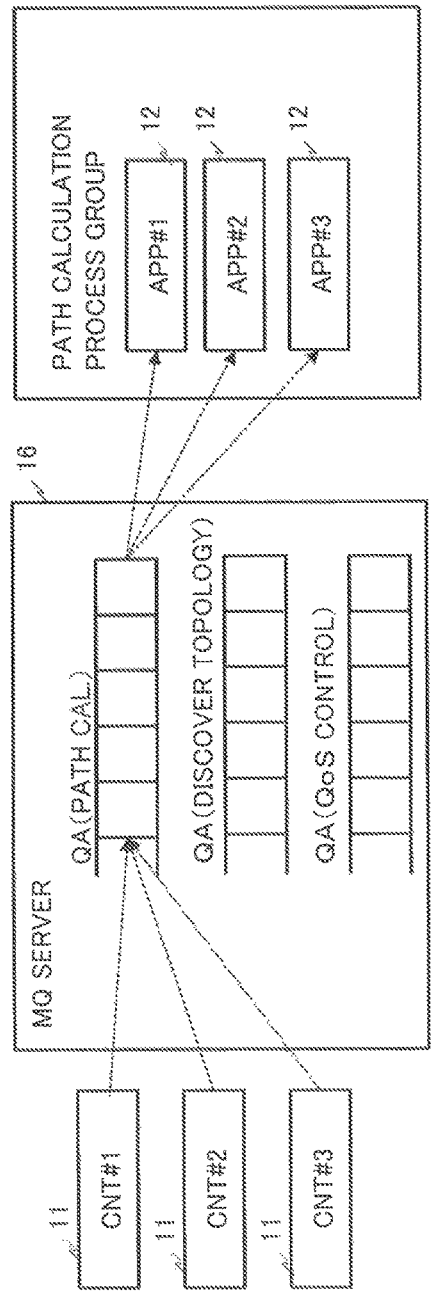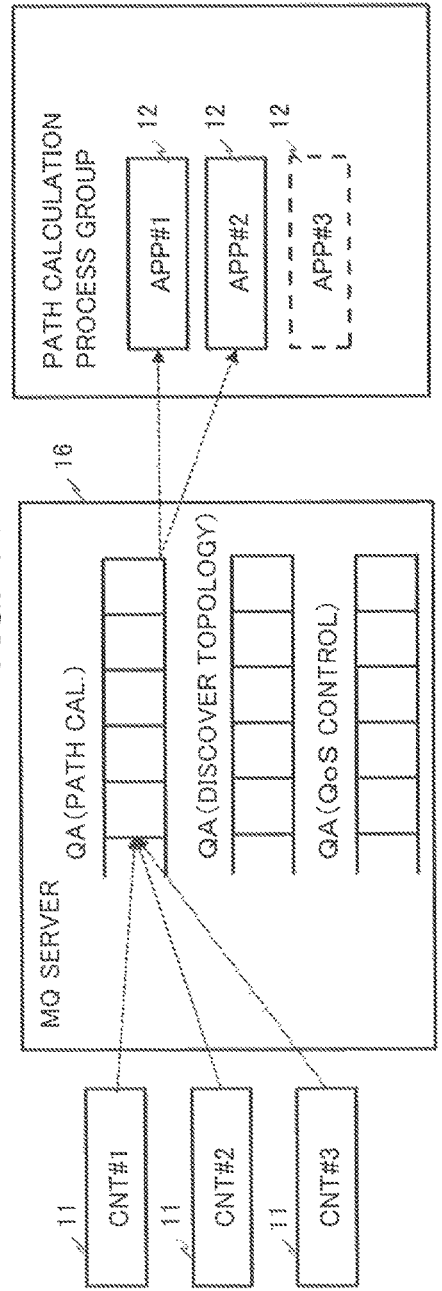

FIG. 17

| CONTROLLER ID | MASTER | SLAVE | ERROR FLAG |
|---|---|---|---|
| CNT#1 | SW#1, SW#2 | | |
| CNT#2 | SW#3, SW#4, SW#5 | SW#6 | |
| CNT#3 | SW#6 | | |

FIG. 18

| SWITCHID | MASTER | SLAVE | ERROR FLAG |
|---|---|---|---|
| SW#1 | CNT#1 | | |
| SW#2 | CNT#1 | | |
| SW#3 | CNT#2 | | |
| SW#4 | CNT#2 | | |
| SW#5 | CNT#2 | | |
| SW#6 | CNT#3 | CNT#2 | |

| MQ SERVER ID | IP ADDRESS | PORT NUMBER | CORRESPONDING RULE (SW ID – QUEUE NAME) | CORRESPONDING RULE (FUNCTION GROUP ID – QUEUE NAME) | ERROR FLAG |
|---|---|---|---|---|---|
| MQ SERVER #1 | XXXX.XXX.XXX.XX | XX | ..... | ..... | |
| MQ SERVER #2 | XXXX.XXX.XXX.YY | YY | ..... | ..... | |

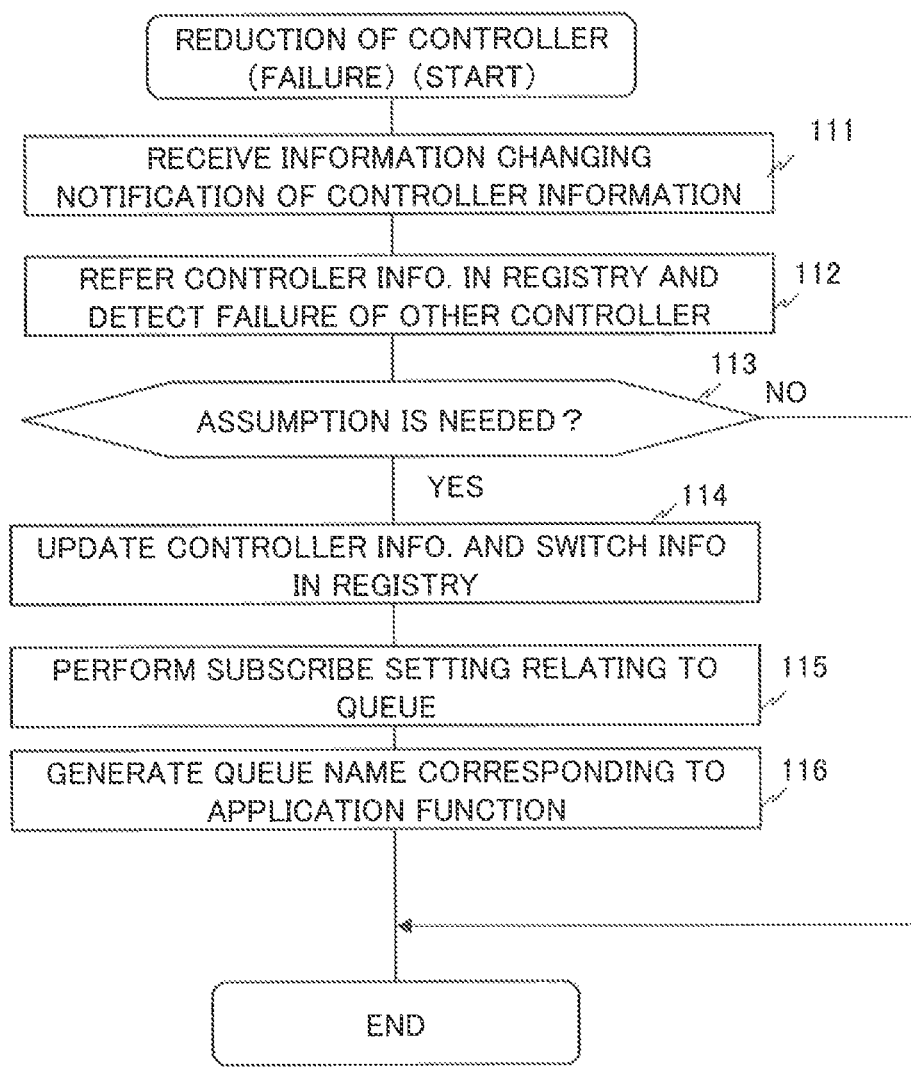

SERVER FOR DISTRIBUTED CONTROLLER SYSTEM

CROSS-REFERENCE TO RELATED APPLICATION

This application is based upon and claims the benefit of priority of the prior Japanese Patent Application No. 2014-36075, filed on Feb. 26, 2014, the entire contents of which are incorporated herein by reference.

FIELD

Disclosure relates to a server.

BACKGROUND

In recent years, network business circles have focused their attentions on Software Defined Networking (SDN). According to the SDN, software called a controller concentrically controls and manages the whole network. This configuration aims at enhancing programmability of the network and attaining automation of control.

The SDN adopts a centralized control model based on the controller. Namely, the controller receives connections of a plurality of switches and controls operations of the respective switches according to a control protocol. Therefore, performance of the controller tends to easily become a bottleneck of the whole system. Such being the case, it is considered to improve scalability of a network system (a distributed controller system) using a distributed controller configured so that plural controllers are coordinated with each other to attain the logically centralized control, though a physical configuration is, e.g., a distributed configuration based on a plurality of servers.

In the distributed controller, a process for controlling the operation of the switch is separated into a controller process and an application process, in which the controller and the application transfer and receive information via a messaging system. In this type of distributed controllers, the controller process and the application process are loose-coupled via the messaging system. Therefore, these distributed controllers are called "loose-coupling type distributed controllers" as the case may be. The distributed controllers enable each of the controller and the application to be scaled out solely. In the following discussion, the controller process is simply referred to as the controller, and the application process is also simply referred to as the application as the case may be.

The messaging system uses a message queue server (abbreviated to the MQ server) including a plurality of queues to store the information transferred and received between the controllers and the applications. In the MQ server, the queue is provided on a per process basis. As described above, the distributed controllers include the controllers and the applications as the processes. Hence, the MQ server includes the queue generated per application and the queue generated per controller. Each queue stores a message addressed to the associated process (the application or the controller).

For more information, see Japanese Patent Laid-Open Publication No. 07-200494.

In the distributed controllers (the related technology) described above, the number of the applications and the number of the controllers increase or decrease due to scale-out or scale-in or due to occurrence of a failure as the case may be. Further, it is considered in the distributed controllers that a throughput of the whole system is improved by increasing the number of the processes (the controllers, the applications). Thus, the related technology assumes that the number of the processes (the controllers, the applications) is increased or decreased.

In the related technology, however, as described above, the queue is generated on the per process basis. Therefore, for example, when the number of the controllers is increased or decreased, such a state occurs that a certain controller executes an irregular process of obtaining not only information stored in the queue associated with the controller itself but also information stored in the queue associated with another controller other than the controller. Thus, the related technology has a problem that the process of reading the information from the queue and transmitting the readout information to the controller becomes complicated in order to be flexible to an occasion of increasing or decreasing the number of the controllers.

Moreover, when there is a plurality of applications for executing a certain process for load sharing of a certain process, the controller grasps the number of the applications capable of executing a certain process and allocates the information in distribution to the plurality of queues associated with the plurality of applications. Thus, the related technology has a problem that the process of accumulating the information in the queue becomes complicated on the occasion of accumulating the information in the queue because of taking account of the number of destinations to which the information given from the queue is allocated.

As described above, the related technology has the problem that the queue related process becomes complicated, such as the process of reading the information from the queue and transmitting the readout information and the process of accumulating the information in the queue, in order to be flexible to the increase or decrease of the processes (the controllers, the applications).

SUMMARY

One of embodiments is a server which is provided in a network system that controllers control switches based on information given from an application. The server includes queues, each of which is associated with the switches, to store information given from the application directed to the associated switch, a receiver to receive, from each controller, destination information including queue designating information and information for transmitting information read from the queue designated by the queue designating information to one of the controllers being a destination of the read information, and a transmitter to transmit the information read from each of the queues to one of the controllers to control at least one of the switches associated with each of the queues based on the destination information.

The target and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 is an explanatory diagram of the method of allocating the queues to the applications according to the embodiment;

FIG. 11 is an explanatory diagram of the method of allocating the queues to the applications according to the embodiment;

FIG. 17 illustrates an example of a data structure of a table held by a controller information storage unit; and FIG. 18 illustrates an example of a data structure of a table held by a switch information storage unit;

FIG. 20 illustrates an example of a data structure of a table held by an MQ server information storage unit;

FIG. 35 is a flowchart illustrating an example of an operation when the number of the controllers decreases due to a failure etc.

DESCRIPTION OF EMBODIMENTS

Embodiments of the present invention will hereinafter be described with reference to the drawings. A configuration of the embodiment is an exemplification, and the present invention is not limited to the configuration of the embodiment.

[Related Technology]

An in-depth description of problems about a network system (Related Technology) using distributed controllers with a queue being generated per process will be made before describing the embodiment of the present invention.

<<First Problem>>

A problem arising when a failure occurs in a controller, will be elucidated by way of a first problem. A distributed controller system (distributed controller environment) is configured such that each controller controls a part of a plurality of switches in a network, and all the controllers cover the control of all the switches in the network.

Namely, a master controller exists for each switch, and the switch is controlled by only the master controller when in a normal status. Upon occurrence of the failure in a certain controller (i.e., the number of normal controllers decrease), at least one of the remaining normal controllers becomes the master controller and seamlessly takes over the operation being performed so far by the certain controller.

Figure 1:
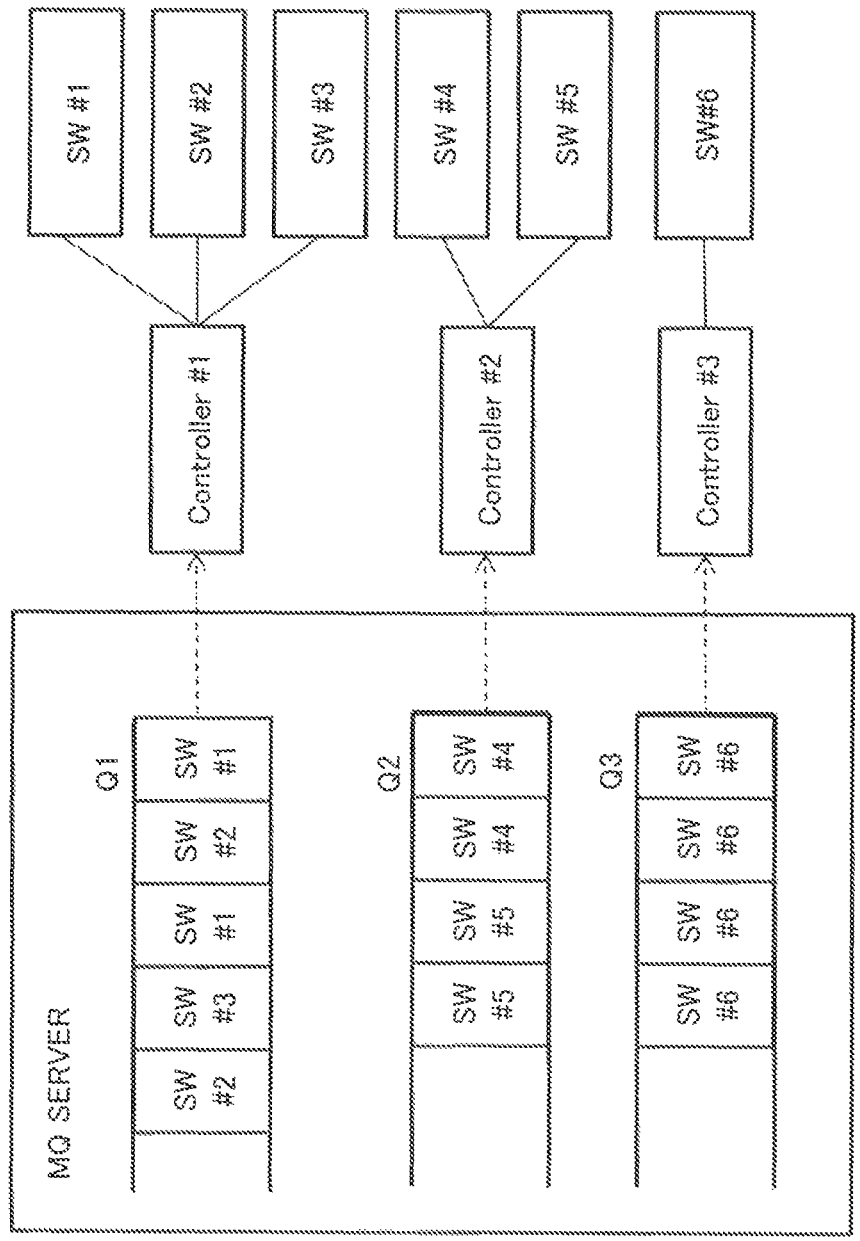
FIG. 1 is an explanatory diagram of a first problem of a related technology, illustrating a relationship between a queue generated per process, a controller and a switch.

FIG. 1 is an explanatory diagram of the first problem, illustrating a relationship between the queue generated per process, the controller and the switch. In FIG. 1, a controller #1 operates as the master controller for a switch (SW) #1, a switch (SW) #2 and a switch (SW) #3. A controller #2 operates as the master controller for a switch (SW) #4 and a switch (SW) #5, and a controller #3 operates as the master controller for a switch (SW) #6.

An MQ server includes queues Q1, Q2 and Q3 each generated per controller process (controllers #1-#3). Each of the queues Q1-Q3 temporarily stores (accumulates) message(s) used for the associated controller as the master controller to control the switch(es). The messages addressed to the SW #1-SW #3 are stored in the queue Q1 associated with the controller #1. The messages addressed to the SW #4 and the SW #5 are stored in the queue Q2 associated with the controller #2. The messages addressed to the SW #6 are stored in the queue Q3 associated with to the controller #3.

Figure 2:
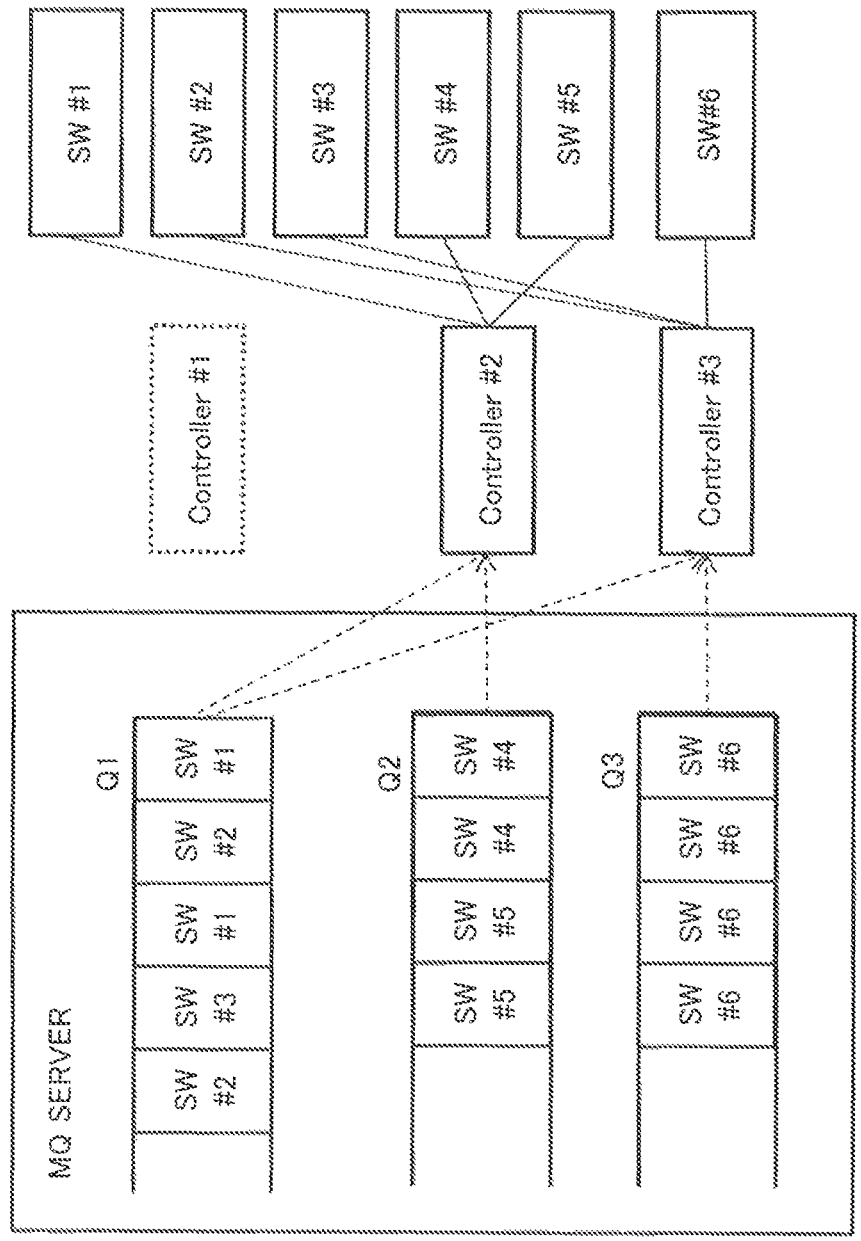
FIG. 2 depicts a situation when a failure occurs in a controller #1.

Such a situation is considered that the failure occurs in the controller #1 in the status illustrated in FIG. 1. FIG. 2 depicts a case when the failure occurs in the controller #1. In this case, each of the switches SW #1, SW #2 and SW #3 is subordinated to any one of the remaining normal controllers #2 and #3 as new master controllers. For example, a case is assumed, in which the SW #1 is subordinated to the controller #2, while the SW #2 and the SW #3 are subordinated to the controller #3.

In FIG. 2, messages relating to the SW #1, the SW #2 and the SW #3 being unprocessed by the controller #1 are stored in the queue Q1. Therefore, Each of the controllers #2 and #3 serving as the new master controllers selectively read, from the queue Q1, only the messages relating to the switches.

To be specific, the controller #2 requests the MQ server to read the message relating to the SW #1 from the queue Q1 and to transmit the readout message to the controller #2 itself. The controller #3 requests the MQ server to read the messages relating to the SW #1 and the SW #3 from the queue Q1 and to transmit the readout messages to the controller #3 itself.

Thus, when in the normal status (before the occurrence of the failure), each of the controllers #1-#3 performs an operation for reading the message (an operation for requesting the MQ server to read and transmit the message) from only any one of the queues Q1-Q3, which is associated with the controller itself. By contrast, when the failure occurs (after the occurrence of the failure), each of the controllers #2 and #3 performs not only the operation of reading the message from the associated queue Q2 or Q3 but also an operation of reading the message from the queue Q1 associated with another controller #1 (with the occurrence of the failure). In this way, the operation of the controller taking over the operation of the controller with the occurrence of the failure becomes irregular (complicated) as compared with the operation before the occurrence of the failure.

In this respect, specifications of the existing MQ server do not support the operation of transmitting the message already stored in the queue to the new master controller, according to a content of the message (for example, a destination of the message).

<<Second Problem>>

Figure 3:
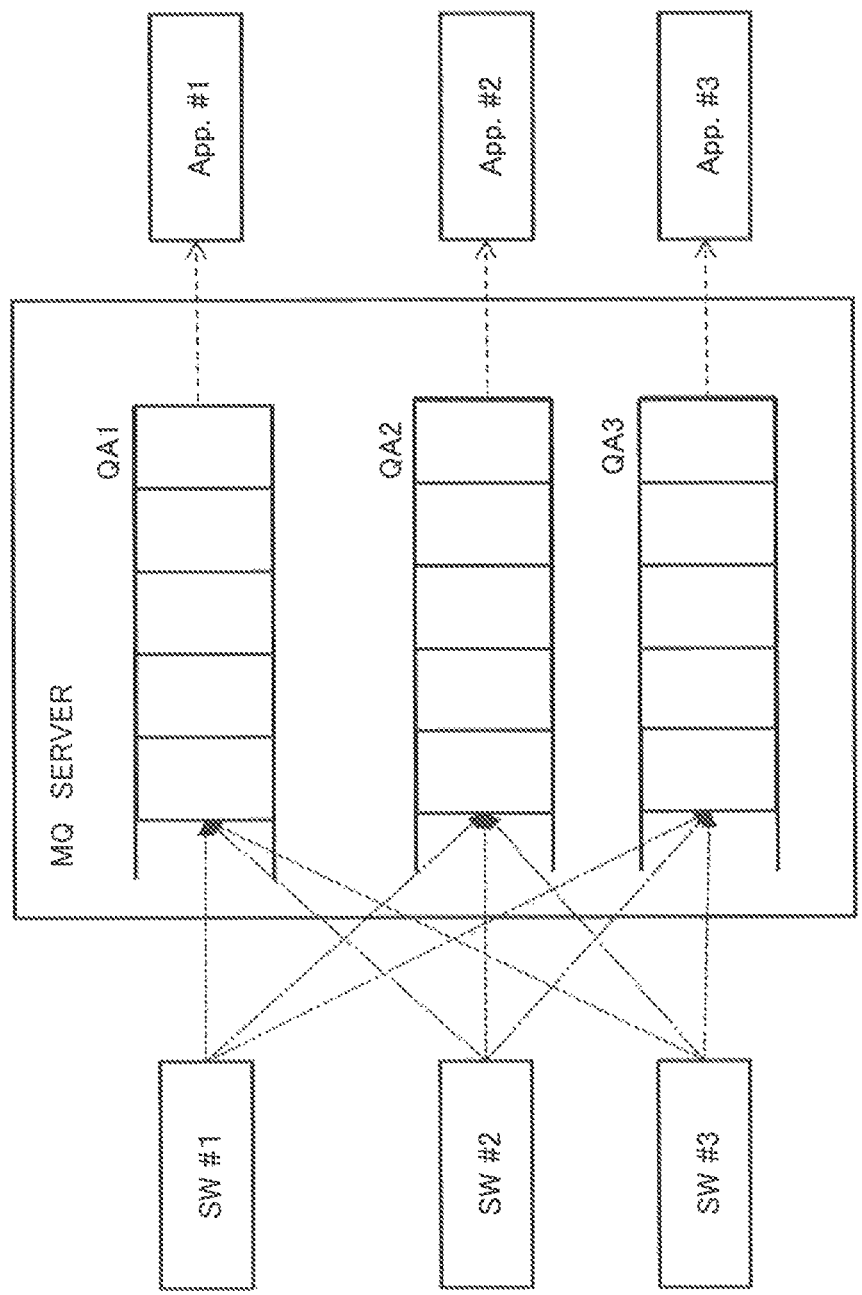
FIG. 3 is an explanatory diagram of a second problem inherent in a related technology.

A problem pertaining to handling a load balance when application increase will be elucidated by way of a second problem. When the MQ server includes the queues each generated per process, such a situation is considered that the applications operate in a plurality of processes for scale-out. The application is configured by the plurality of processes to provide the same function for the scale-out as the case may be. FIG. 3 is an explanatory diagram of the second problem inherent in the related technology. FIG. 3 illustrates three application processes (App. #1, App. #2 and App. #3) to provide the same function in order to improve a throughput based on load sharing (load balance).

The MQ server includes a queue QA1 associated with an application #1 (App. #1), a queue QA2 associated with an application #2 (App. #2) and a queue QA3 associated with an application #3 (App. #3).

In view of a point that the same function is executed by the plurality of processes (the plurality of applications #1-#3) for improving the throughput, such a trial is made as to distribute the messages impartially to the respective applications #1-#3. In this case, each of the controllers (the controllers #1-#3 illustrated in FIG. 3) to transmit the messages to the application sides allocates (stores) the message to any one of the queues QA1, QA2, QA3 while being aware of the number of application processes.

Considered further is an instance that the application process count is incremented by "1" for the scale-out (the instance of adding an unillustrated application #4 (App. #4) having the same function as the applications #1-#3 have). In this instance, a queue QA4 (unillustrated) associated with the application #4 is generated in the MQ server. Thereupon, the controllers #1-#3 are aware of the queue QA4 being generated in the MQ server (the application process count increases to "4"), and allocates the messages in distribution to any one of the queues QA1-QA4, respectively. Thus, the controllers #1-#3 being aware of the application status including the application count allocate the messages to the plurality of queues. Accordingly, the operation becomes intricate.

<<Third Problem>>

The distributed controller system according to the related technology adopts the configuration including the single MQ server as the messaging system. In this case, scalability of the messaging system itself becomes a bottleneck, which in turn restrains the scalability of the distributed controller system.

It is therefore considered that a scalable distributed controller system is attained by enhancing the scalability of the messaging system. In other words, it is considered to configure the messaging system with the scalability being enhanced by using not the single MQ server but a plurality of MQ servers.

Herein, a configuration is considered, which uses the plurality MQ servers in the distributed controller system to which a method of generating the queue on a process by process basis is applied. A method pursuant to a data segmentation method called "sharding" in a database (DB) technology is considered as the simplest method. Concretely, as illustrated in FIG. 4, the queues existing in one MQ server on the process by process basis are segmented, and the segmented queues are allocated to the plurality of MQ servers.

Figure 4:
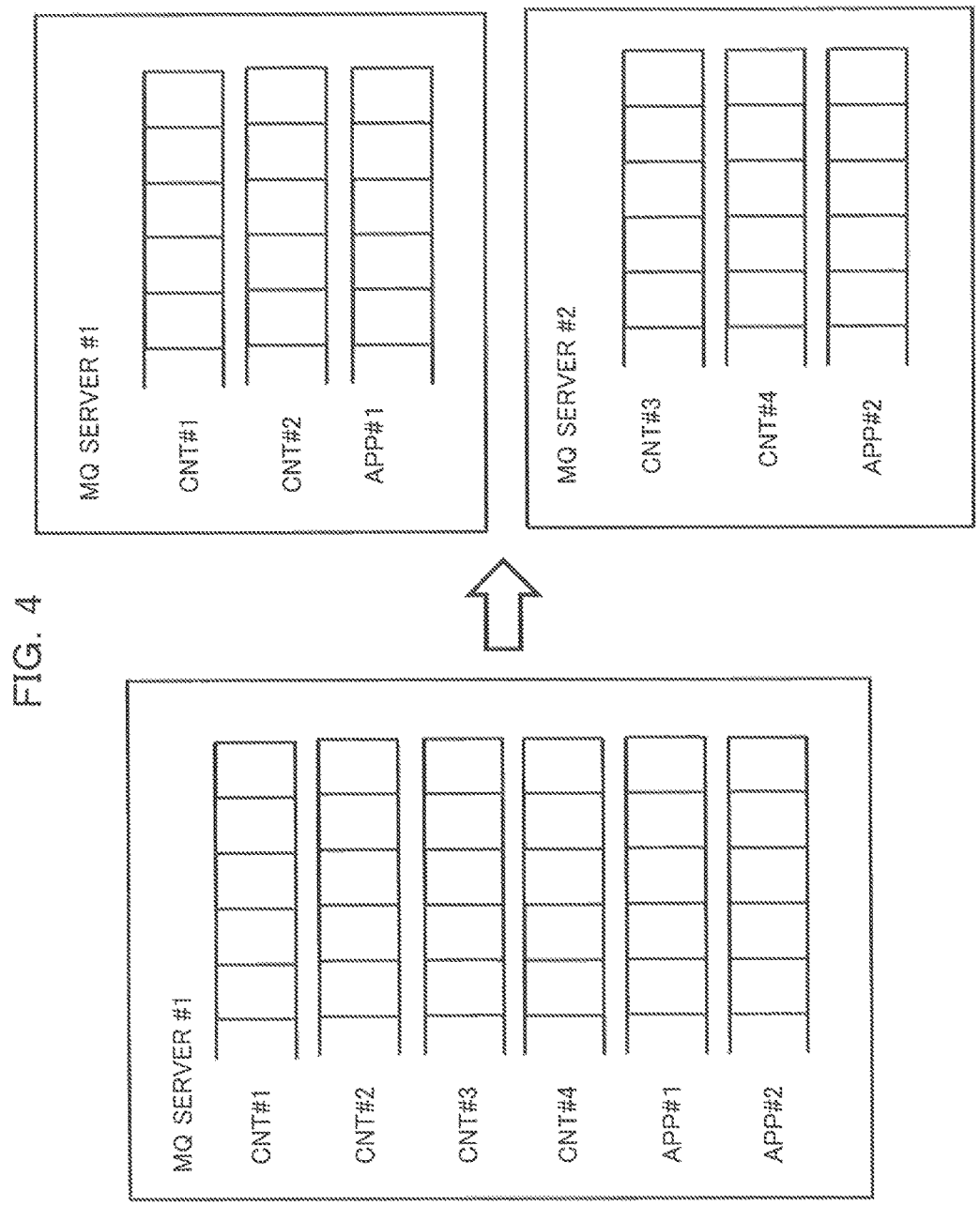
FIG. 4 illustrates an example (the related technology) when arranging a plurality of MQ servers.

An example depicted in FIG. 4 is that an MQ server #1 includes controllers (CNT) #1-#4 and a plurality of queues associated with applications (APP) #1 and #2. In contrast with this arrangement, due to the segmentation into the plurality of queues, the controllers #1, #2 and the queue for the application #1 are arranged in the MQ server #1. On the other hand, the controllers #3, #4 and the queue for the application #2 are arranged in the MQ server #2. According to this method, each of the queues possessed by one MQ server is arranged in any one of the plurality of MQ servers (MQ server group).

Figure 5:
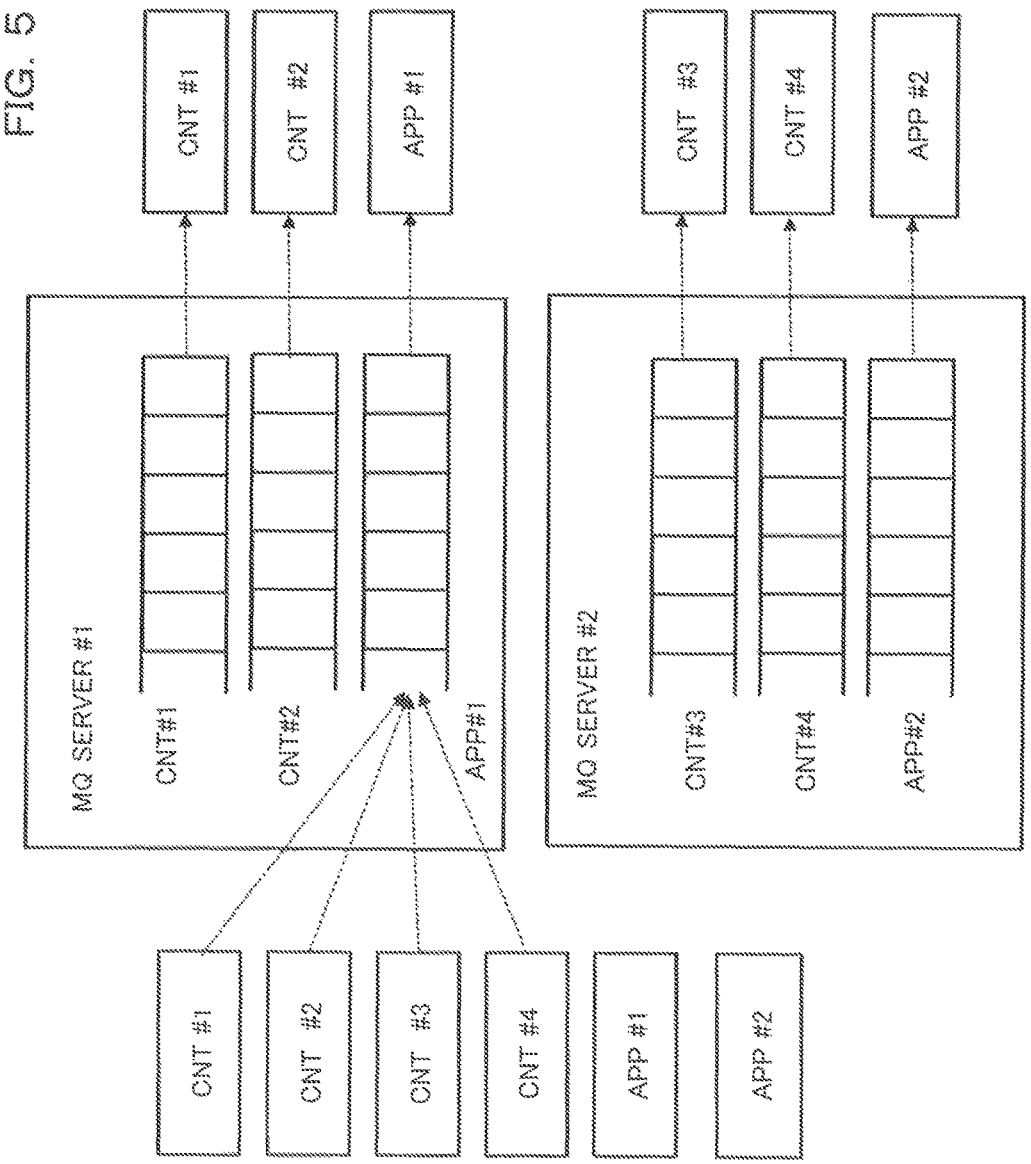
FIG. 5 illustrates a problem in a configuration depicted in FIG. 4.

FIG. 5 depicts a problem inherent in the configuration illustrated in FIG. 4. In the queue segmentation arrangement method described above, when the destinations of the messages are evenly distributed to all the processes, loads on the respective MQ servers are equilibrated, thereby enabling the individual MQ servers to be operated efficiently.

By contrast, as illustrated in FIG. 5, when the messages are issued intensively to the application #1 from the controllers #1-#4, the loads are concentrated not on the MQ server #2 but on the MQ server #1, resulting in an inefficient status. In other words, according to the segmentation arrangement method described above, the queue associated with a certain process is arranged in only one server of the MQ server group, and hence, when the messages are allocated in one-sided concentration to their destination, such a significance (the efficiency owing to the load balance) degrades as to provide the plurality of MQ servers.

A network system using distributed controllers according to an embodiment, which will hereinafter be described, solves the first through third problems elucidated above.

EMBODIMENTS

The network system using the distributed controllers according to the embodiment will hereinafter be described.

One of object of the embodiments to provide a technology capable of restraining the process related to the queue from becoming complicated due to a factor, i.e., the increase or the decrease of the controllers or the applications.

<Example of Architecture of Network System>

Figure 6:
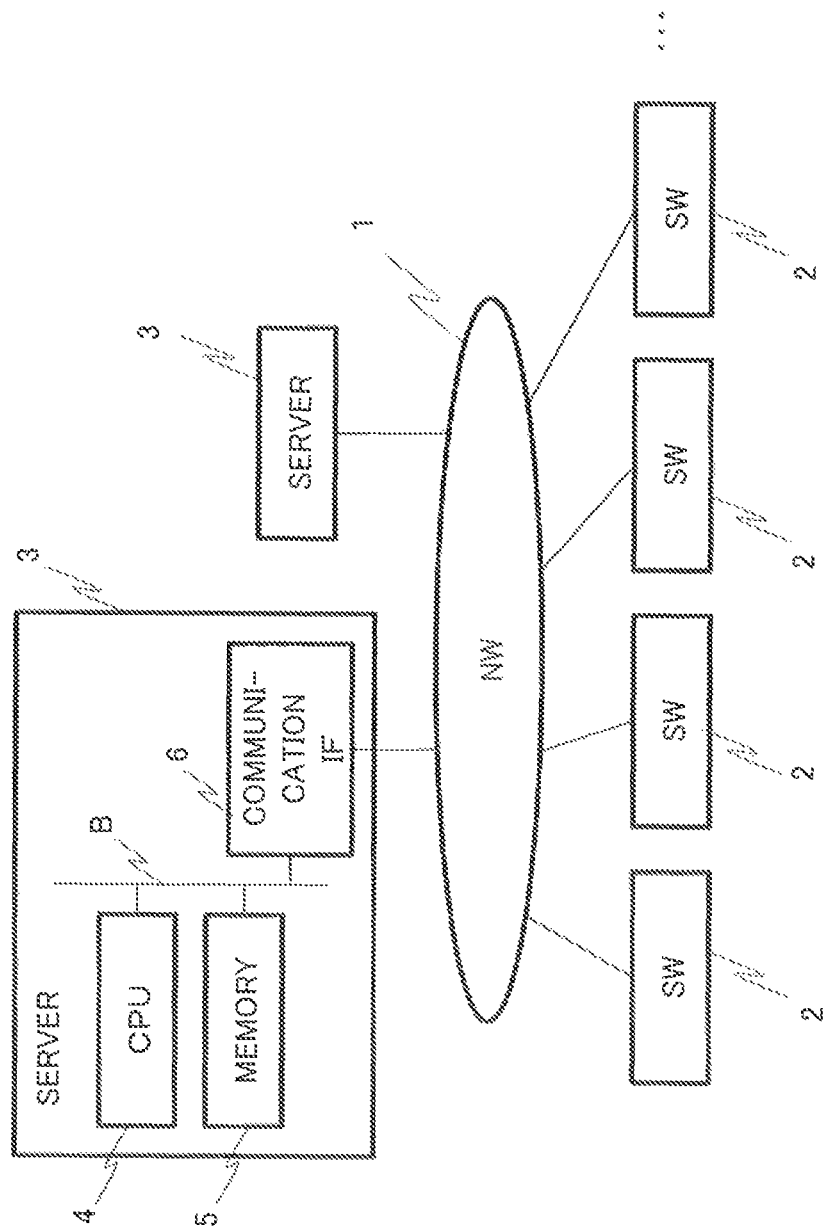
FIG. 6 illustrates an example of architecture of a network system to which distributed controllers are applied.

FIG. 6 illustrates an example of architecture of the network system to which the distributed controllers are applied. In FIG. 6, the network system includes a plurality of switches 2 and a single or a plurality of servers 3, which are interconnected via a network (NW) 1.

The network 1 is defined as an Internet Protocol (IP) network such as Internet, an Intranet or a Local Area Network (LAN). The switch 2 is, e.g., a router or a Layer3 switch. The switch 2 may include a Layer2 switch or a switching HUB. The switch 2 may be a physical switch (real switch) and may also be a virtual switch being virtually generated on a computer.

The server 3 is one example of a computer including a processor and a memory. A dedicated server machine or a general-purpose computer such as a personal computer (PC) and a workstation (WS) can be applied to the server 3.

The server 3 includes a Central Processing Unit (CPU) 4, a memory 5 and a communication interface (communication IF) 6, the communication IF 6 being connected to the network 1 via a physical line. The memory 5 includes a nonvolatile storage medium and a volatile storage medium. The CPU 4 is one example of a processor (control apparatus).

The nonvolatile storage medium is, for example, at least one of a Read Only Memory (ROM), a hard disk, a Solid State Drive (SSD), an EEPROM (Electrically Erasable Programmable ROM) and a flash memory. The nonvolatile storage is used to store at least one computer program executed by the CPU 4 and data used when executing the program. The volatile storage medium is, e.g., a Random Access Memory (RAM) and is used as a working area for the CPU 4. The memory 5 is one example of a "storage" and a "storage medium".

The communication IF 6 is an apparatus to handle a conversion of signals related to the communications and a protocol conversion. For example, communication equipment called a network card or a LAN card is applied to the communication IF 6. The CPU 4 loads and executes the program stored in the memory 5, thereby the CPU 4 operates as a distributed controller to control an operation of each switch 2.

Figure 7:
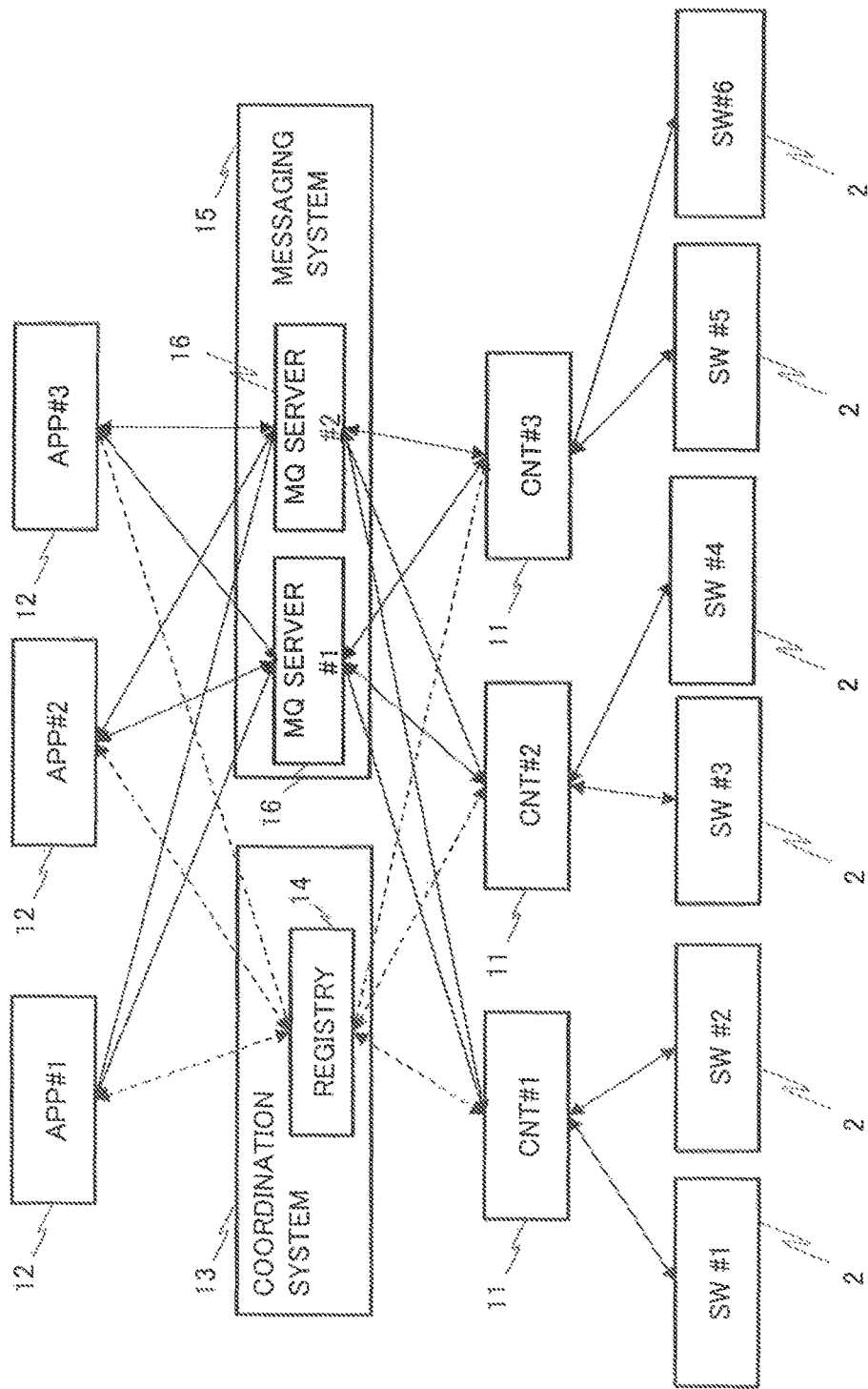
FIG. 7 is a diagram schematically illustrating the network system using distributed controllers (loose coupling type distributed controllers) realized by a CPU executing a program.

FIG. 7 is a diagram schematically illustrating a network system using distributed controllers (loose-coupling type distributed controllers) realized by the CPU 4 executing the program. The network system using the distributed controllers includes a plurality of switches 2, a plurality of controllers 11, a single or a plurality of applications 12, a coordination system 13 and a messaging system 15.

One controller 11 controls a part of the plurality of switches 2 on the network. All of controller processes cover control of the whole switches on the network. The application (an application process) gives information relating to control of the switch 2 to the controller 11.

The coordination system 13 and the messaging system 15 are intermediary systems for transmitting and receiving the information between the application 12 and the controller 11, these systems being divided based on their roles.

The coordination system 13 takes a role of storing mainly such items of information as memberships and statuses of the applications 12 and the controllers 11, which are to be shared among the whole distributed controllers. The coordination system 13 includes a registry 14. The registry 14 is stored with pieces of information on the controllers 11, the applications 12, etc. Other processes can refer to the information stored in the registry 14.

The messaging system 15 is an intermediary system for communications (for transmitting receiving information) between the controller 11 and the application 12. In the distributed controllers, the controllers 11 and the applications 12 send the messages (one example of "information") to each other, thereby performing the operations of the whole system.

Each of the controller 11 controls the switch 2 (a subordinate switch) that operation as a master controller is allocated. Allocation of switches to each of the controller 11 is decided in advance. The subordinate switch 2, when an event (e.g., packet in event) occurs, notifies the controller 11 being the master controller of the occurrence of the event. The controller 11 receiving the notification of the occurrence of the event notifies the application 12 of a message indicating the occurrence of the event via the messaging system 15. The message indicating the occurrence of the event is one example of "switch related information".

The application 12 receives the message indicating the occurrence of the event via the messaging system 15, and determines an action (process) corresponding to the event in accordance with control logic of the application 12 itself. As a result, the application 12, when controlling the relevant switch 2, transmits a message for controlling the designated switch 2 to the controller 11 via the messaging system 15.

The messaging system 15 includes a message queue (MQ) server 16 including a plurality of queues storing information transmitted and received between the controllers 11 and the applications 12. The number of the MQ servers 16 can be increased owing to the scale-out. FIG. 7 illustrates the two MQ servers 16 as an example. The MQ server 16 is one example of a "server".

The controller 11, the application 12, the coordination system 13 (the registry 14) and the messaging system 15 (the MQ server 16) are entities generated by the CPU 4 executing the program. For example, each of the controllers 11 and each of the applications 12 is an "instance" given as a nomenclature in object oriented programming.

The distributed controller as depicted in FIG. 7 may be generated by one server 3 (a physical server: a computer). The distributed controller may also be generated by a coordination process between two or more physical servers as illustrated in FIG. 6. For simplifying the description, the following discussion is based on an assumption that each controller 11, each application 12, the coordination system 13 (the registry 14) and the messaging system 15 (the MQ server 16) are generated on the single server 3.

<Solutions to First Through Third Problems>

Next, a method (process) of solving the first through third problems in the related art will be described. In the embodiment, for solving the first and second problems, the operation is simplified by a method of allocating the queues to the processes (the controller 11, the application 12). The method of allocating the queues each of the controllers 11 and each of the applications 12 will hereinafter be described.

<<Allocation of Queue to Controller>>

In the embodiment, the queue is generated per switch 2, and each controller 11 reads the queue for the switch 2 to be controlled by the controller 11 itself being the master controller (receives information of the associated switch 2 from the MQ server 16).

Figure 8:
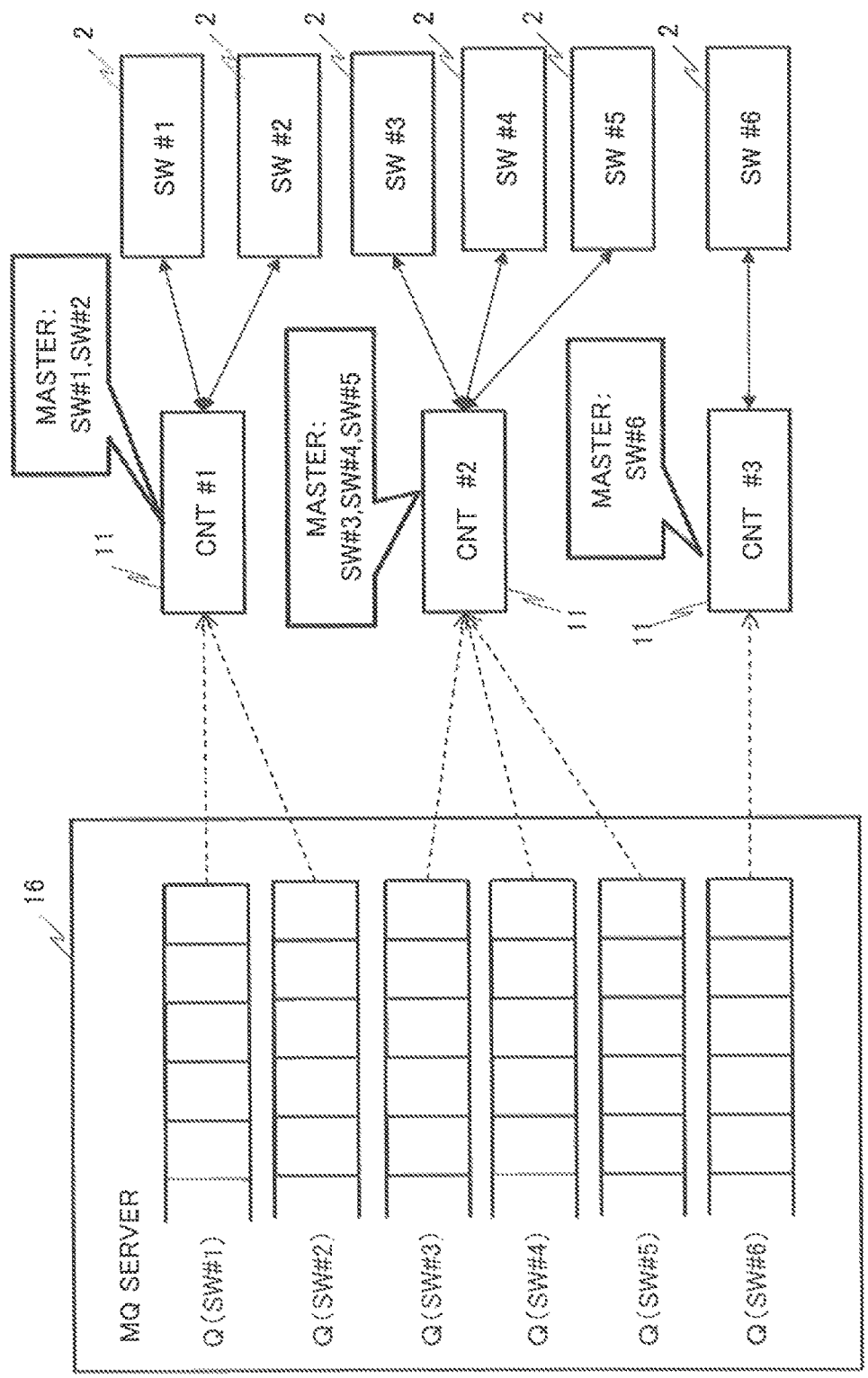
FIG. 8 is an explanatory diagram of a method of allocating queues to the controllers according to an embodiment.
Figure 9:
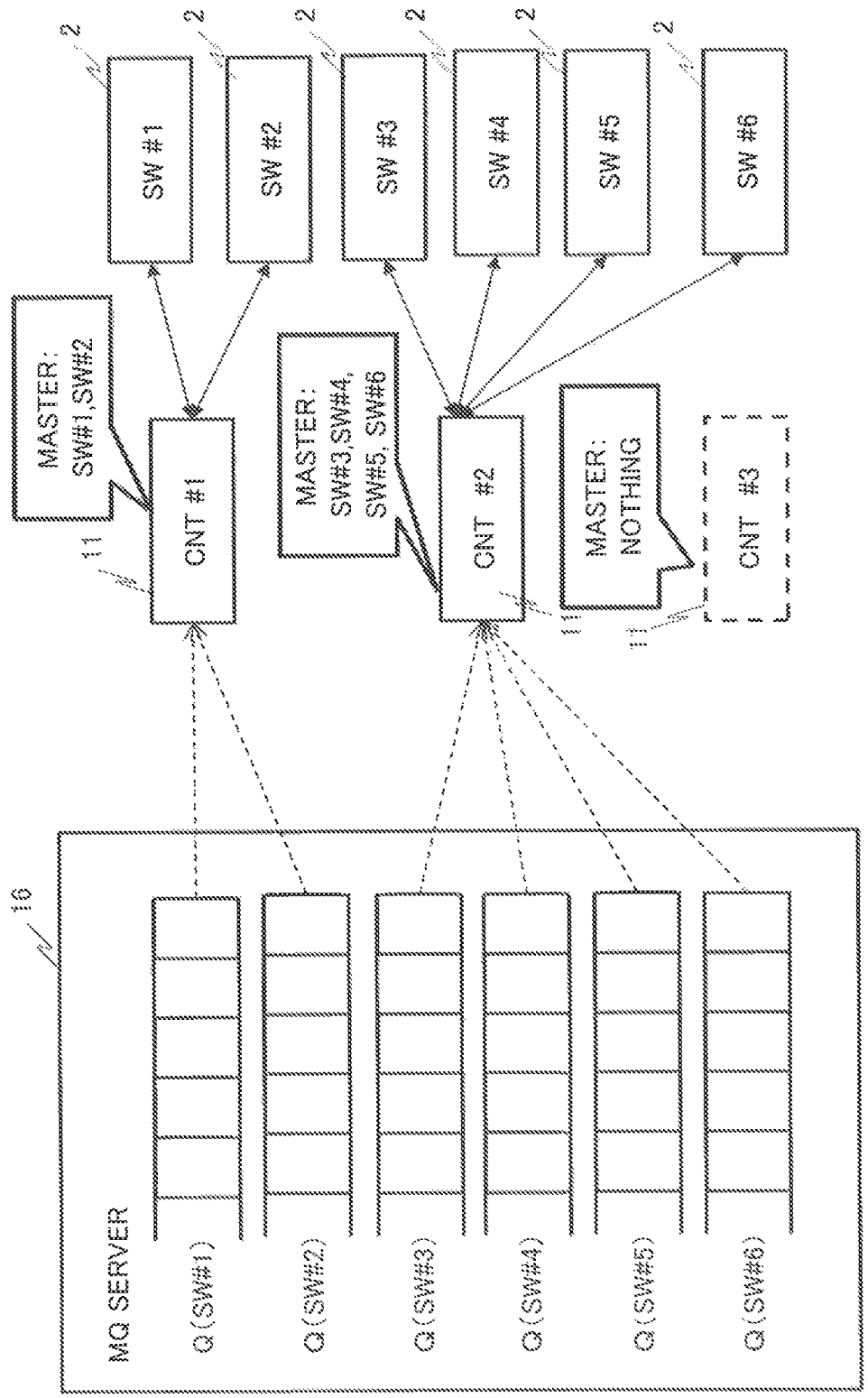
FIG. 9 is an explanatory diagram of the method of allocating the queues to the controllers according to the embodiment.

FIGS. 8 and 9 are explanatory diagrams of a method of allocating queues to the controllers according to the embodiment. In an example illustrated in FIG. 8, switches (SW)

1-(SW) #6 are depicted as the switches 2, and three controllers #1-#3 are illustrated as the controllers 11. The controller (CNT) #1 is a master controller of the switch (SW) #1 and the switch (SW) #2. Further, the controller (CNT) #2 is a master controller of the switch (SW) #3, the switch (SW) #4 and the switch (SW) #5. Still further, the controller (CNT) #3 is a master controller of the switch (SW) #6.

The MQ server 16 generates the queue Q per switch. To be specific, the MQ server 16 includes a plurality of queues Q associated with the switches #1-#6. Each of the controllers #1-#3 reads the queue Q associated with the subordinate switch 2 (receives the information (message) in the queue Q from the MQ server 16).

Each of the controller #1, the controller #2 and the controller #3 sends transmission destination information containing designation information of a queue to the MQ server 16 so that the message read from the queue Q associated with the switch 2 subordinated to the controller itself is transmitted to the controller itself. The destination information includes queue designating information defined as information indicating the designated queue and transmission destination designating information (a network address etc.) defined as information for sending the message to a predetermined transmission destination (the controller 11). Hereinafter, the "transmission destination information" is referred to as the "destination information."

The MQ server 16 performs, based on the destination information given from each of the controllers #1-#3, setting (connection setting) for transmitting the message being read from the head of each queue Q to the associated controller 11. With this setting, the message is forwarded via a previously established connection without making a determination as to the destination of the message each time the message is read from the individual queue Q.

Thus, the controller #1 receives the messages stored in the queues Q associated with the switches #1 and #2 from the MQ server 16. The controller #2 receives the messages stored in the queues Q associated with the switches #3-#5 from the MQ server 16. The controller #3 receives the messages stored in the queue Q associated with the switch #6 from the MQ server 16.

Note that the connection presetting described above is not an essential element, but the destination determination is made by referring to the destination information each time the message is read as the case may be.

FIG. 9 illustrates an operation when the number of the controllers 11 decreases down to "2", i.e., the controllers #1 and #2, due to the occurrence of the failure in the controller #3 in the status depicted in FIG. 8. FIG. 9 also illustrates an example in which the master controller for the switch #6 is changed into the controller #2 due to the failure of the controller #3. In other words, the associated relationship between the switch #6 and the controller #3 is changed into an associated relationship between the switch #6 and the controller #2 due to the failure of the controller #3 (the decrease in number of the controllers).

The controller #2, when becoming the master controller for the switch #6, gives to the MQ server 16 the destination information for indicating that the message stored in the queue Q associated with the switch #6 is transmitted to the controller #2. Then, the MQ server 16 changes, based on the destination information, the destination of the message read from the queue Q (the switch #6) to the controller #2. Thereby, the controller #2 becomes a status of reading the message (the information) stored in the queue Q associated with the switch #6 (the status of receiving the information transmitted from the MQ server 16).

Thus, each of the controllers #1-#3 sends, to the MQ server 16, the destination information that specifies the queue associated with the switch 2 for which the controller itself acts as the master controller, and requests the MQ server 16 to send information read from the designated queue to the controller. The MQ server 16, in response to the request using the destination information, performs setting for transmitting the message read from the designated queue to the associated controller.

When the controller #2 becomes the master controller for the switch #6 due to the failure of the controller #3, the controller #2 transmits, to the MQ server 16, the destination information for sending information read from the queue Q associated with the switch #6 to the controller #2, while the MQ server 16 performs the setting to change the destination related to the queue Q concerned.

Thus, according to the embodiment, the controller 11 executes the process of sending the destination information containing the designated queue stored with the message (addressed to the switch for which the controller itself acts as the master controller) desired to be received by the controller itself, and containing the designated destination (the controller itself). The MQ server 16 executes, based on the destination information, the process of sending the message stored in the designated queue to the designated destination.

The processes of the controller 11 and the MQ server 16 as described above remain unchanged before and after the failure of the controller 11. Accordingly, the operations of the controller 11 and t the MQ server 16 are simplified. Thus, according to the embodiment, the processes of reading the information from the queue Q and transmitting the readout information as in the related technology are restrained from becoming complicated.

Note that the decreased case of the number of the controllers 11 has been described in FIGS. 8 and 9, however, the same operation is applied to an increased case of the number of the controllers 11. Namely, there is no change in content of the processes related to the queue before and after the operation of the controller 11. Hence, the processes are simplified (restrained from becoming complicated).

<<Allocation of Queue to Application>>

In the embodiment, queues are generated on a unit of functions (function group) of the applications 12. Each application 12 reads the queue associated with the function group to which the application 12 belongs. FIGS. 10 and 11 are explanatory diagrams of a method of allocating the queues to the applications according to the embodiment.

In the example illustrated in FIG. 10, a path calculation, a topology discovery and QoS (Quality of Service) control are defined by way of examples of the function groups (application functions) of the applications 12. FIG. 10 also illustrates an example in which a plurality of applications 12 (the application (APP) #1-#3) is provided as an application process group to conduct the path calculation.

In this case, the MQ server 16 is provided with queues QA associated with the path calculation, the topology discovery and the QoS control, respectively. The respective controllers 11 (the controllers (CNT) #1-#3 are illustrated in FIG. 10) send the messages each containing the designated queue as a write destination to the MQ server 16. The MQ server 16 writes the message to the designated queue.

Each of the applications #1-#3 sends the destination information containing the queue designating information and the destination designating information to the MQ server 16 in the same way as the controller 11 does. The MQ server 16 performs setting for sending the information read from the designated queue QA to the designated destination by use of the destination information. Thus, the method of setting the destination of the information read from each queue QA is the same with the controller 11 and the application.

However, each of the applications #1-#3 illustrated in FIG. 10 provides the same function (the same process). Therefore, the MQ server 16 distributes the information (the message) read from the queue QA corresponding to the path calculation to anyone of the applications #1-#3 in accordance with a predetermined rule. For example, the MQ server 16 discretely distributes the message read from the queue QA to any one of the applications 12 in accordance with a variety of rules such as a round robin method and a method of distributing the message to the application with a small load.

FIG. 11 depicts an operation when the number of the application processes (the number of the applications 12) decreases from the status illustrated in FIG. 10. An example illustrated in FIG. 11 demonstrates that the number of the applications 12 decreases due to disappearance of the application #3. In this case, a session established between the MQ server 16 and the application #3 is disconnected. Hence, it simply follows that the information (the message) stored in the queue QA (the path calculation) is not distributed to the application #3. The information is transmitted based on the destination information to the remaining applications #1 and #2.

Accordingly, when viewing the processes on the side of the controllers 11 (illustrated as the controllers #1-#3), there is no change in processing before and the after the disappearance of the application #3 (before and after the decrease in number of the applications 12). Namely, irrespective of the decrease in number of the applications 12, such a process is carried out that the path calculation related messages transmitted from the controllers #1-#3 are stored in the queue QA corresponding to the path calculation. Thus, in the embodiment, the controller 11 may not grasp a variation in number of the applications. Therefore, the process related to the queue (the write process to the queue) is simplified (retrained from becoming complicated).

Note that the examples illustrated in FIG. 10 and have discussed the operation when the number of the applications 12 decreased, however, the operation (or process) for storing the path calculation related messages transmitted from the controllers 11 (the controllers #1-#3) in the queue QA does not change. It simply follows that the MQ server 16 receives the destination information from the application 12 (unillustrated) related to an addition (an increase), and distributes the messages read from the relevant queue QA (the path calculation) selectively to the applications 12 related to the addition.

<Allocation of Queue to Plurality of MQ Servers>

In the embodiment, a solution to the third problem entails not segmenting the queues which the MQ servers take charge of but equipping all the MQ servers with the same queue structure. Namely, in the embodiment, there is prepared a plurality of MQ servers 16 each having the same queue structure. In other words, it follows in the embodiment that the queue stored with the message provided to a certain process (the controller 11, the application 12) exists in each of the plural MQ servers 16.

Figure 12:
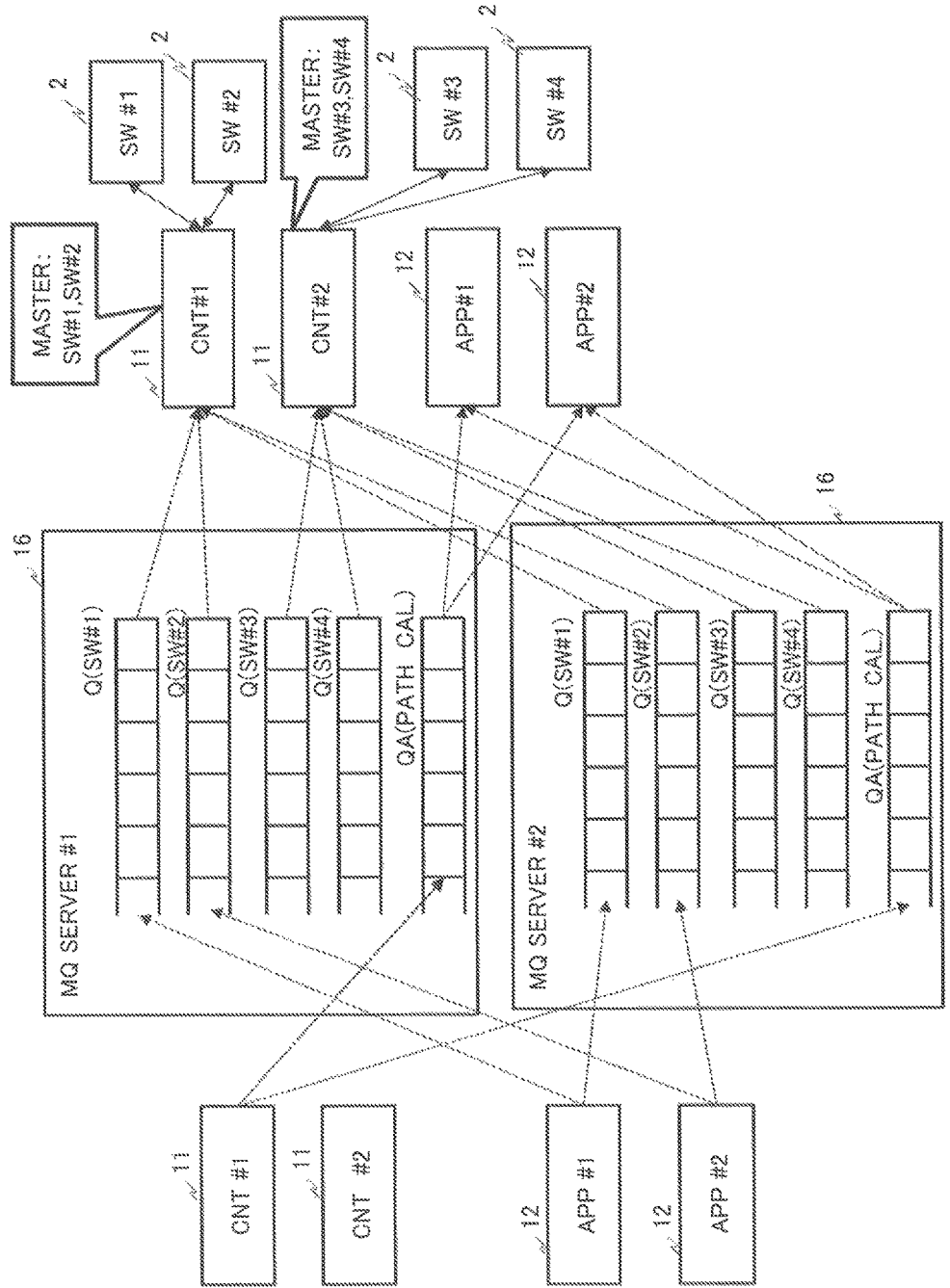
FIG. 12 illustrates an example of preparing the plurality of MQ servers.

FIG. 12 depicts an example of preparing the plurality of MQ servers 16. The example illustrated in FIG. 12 is that the controllers #1 and #2 are depicted as the controllers 11, and the applications #1 and #2 are depicted as the applications 12. Plural switches #1-#4 are depicted as the switches 2.

The master controller for the switches #1 and #2 is the controller #1, and the master controller for the switches #3 and #4 is the controller #2. Two MQ servers #1 and #2 having the same queue structure are prepared as the MQ servers 16. Each MQ server 16 is provided with the queues Q associated with the switches #1-#4 and the queue QA associated with the function group "path calculation" provided by the application 12.

The two MQ servers #1 and #2 having the same queue Q (QA) are provided, and hence the information (message) write side (the controller 11, the application 12) can select one of the MQ servers #1 and #2, and can write (send) the message to the queue.

The controller 11 and the application 12 can receive the messages in parallel from the queues Q (QA) existing in both of the MQ servers #1 and #2. For example, when focusing an attention on the controller #1, the controller #1 can receive, in parallel, the messages for the switches #1 and #2, the messages existing in the queues Q of the MQ servers #1 and #2.

To give an example, the message for the switch #1 is written by the application #1 to one of the MQ servers #1 and #2, and the message for the switch #2 is written by the application #2 to one of the MQ servers #1 and #2.

Further, when focusing the attention on the application #1, the application #1 can receive, in parallel, the message stored in the queue QA for the path calculation, the queue QA existing in one of the MQ servers #1 and #2.

According to the operation described above, the information (message) write side (the transmission side: the controller 11, the application 12) can select the message destination (the write destination queue) from the plurality of MQ servers 16 on the message by message basis. Hence, a write message processing count can be increased corresponding to the increment in number of the MQ servers 16 by selecting the MQ server 16 so that the MQ servers 16 as the write destinations are adequately distributed.

Moreover, a message read side (a reception side: the controller 11, the application 12) receives the messages in parallel from the plurality of MQ servers 16. Therefore, the read side is also capable of increasing a read message processing count in a way that corresponds to the increment in number of the MQ servers 16. In comparison with the method of simply segmenting the queues (FIG. 4), even in such a one-sidedly concentrated status that a large number of messages are addressed to a designated process, the queue structure according to the embodiment enables all the MQ servers 16 to be utilized effectively.

Thus, according to the network system using the distributed controllers according to the embodiment, the operation can be simplified (restrained from being complicated) when increasing or decreasing the processes, and the scalability can be improved by using the plurality of MQ servers 16.

<Detailed Description of Components>

Next, in-depth descriptions of the switch 2, the controller 11, the application 12, the registry 14 and the MQ server 16, which configure the distributed controllers exhibiting the operational effect described above, will be made. As will be understood from the description made so far, there may exist the pluralities of switches 2, controllers 11, applications 12 and MQ servers 16, respectively.

<<Switch>>

The switch 2 is controlled by the controller 11 corresponding to the master controller in accordance with a predetermined control protocol (e.g., Openflow). The switch 2 exchanges the information with the controller 11. Namely, the switch 2 receives a control message from the controller 11 and performs an operation corresponding to the control message. On the other hand, the switch 2 transmits information indicating an event to the controller 11 in order to notify the controller of the event occurring within the switch 2.

Figure 13:
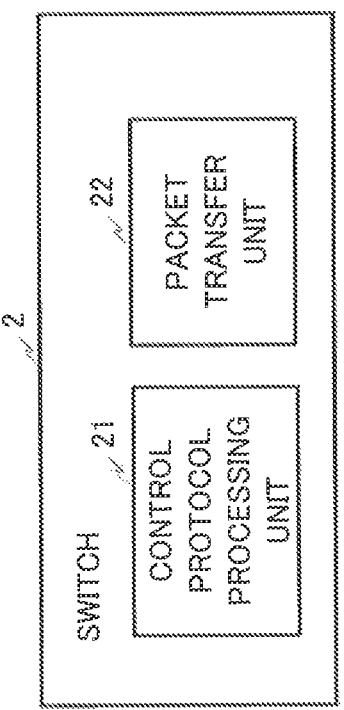
FIG. 13 illustrates an example of a configuration of the switch.

FIG. 13 illustrates an example of a configuration of the switch 2. The switch 2 includes a control protocol processing unit 21 and a packet transfer unit 22. The control protocol processing unit 21 executes a process based on the control message received from the controller 11. The packet transfer unit 22 executes a packet transfer process by forwarding a packet received by the packet transfer unit 22 to a predetermined route (port) as a part of the process based on the control message.

<<Controller>>

The controller 11 notifies the application 12 of the event occurring in the switch 2 via the MQ server 16 while controlling the switch 2 by use of the control protocol. Further, the controller 11 issues the control message to the switch 2 in accordance with the message transmitted by the application 12. Moreover, the controller 11 transfers and receives the message to and from the MQ server 16.

Figure 14:
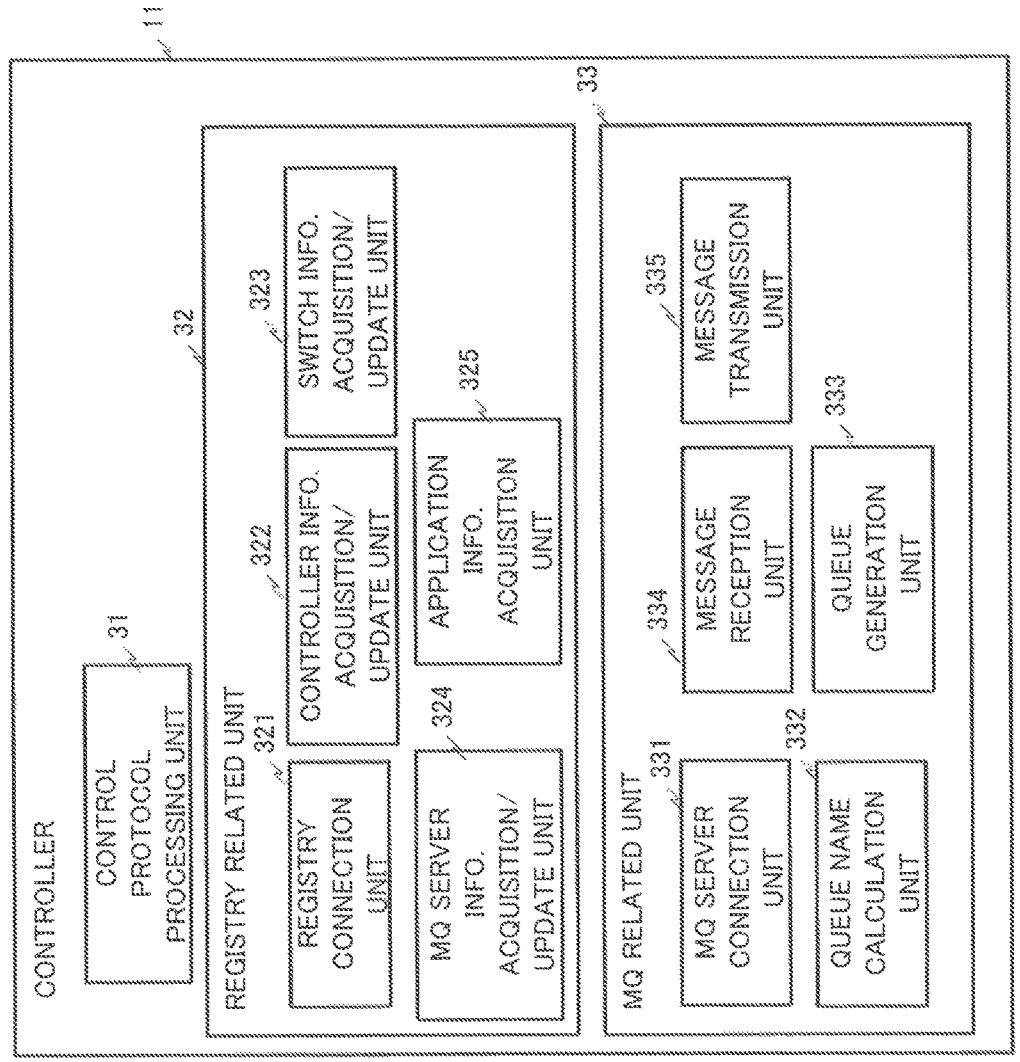
FIG. 14 illustrates an example of a configuration of the controller.

FIG. 14 illustrates an example of a configuration of the controller. The controller 11 includes a control protocol processing unit 31, a registry related unit 32 and an MQ related unit 33. The registry related unit 32 executes a process in coordination with the registry 14. The registry related unit includes a registry connection unit 321, a controller information acquisition/update unit 322, a switch information acquisition/update unit 323, an MQ server information acquisition unit 324 and an application information acquisition unit 325.

The registry connection unit 321 handles a process of establishing a connection between the controller 11 and the registry 14 for referring to and acquiring the information stored (accumulated) in the registry 14. The controller information acquisition/update unit 322 handles a process of acquiring and updating information (controller information) about the controller 1, the information being stored in the registry 14.

The switch information acquisition/update unit 323 handles a process of acquiring and updating information (switch information) about the switch 2, the information being stored in the registry 14. The MQ server information acquisition unit 324 handles a process of acquiring information (MQ server information) about the MQ server 16, the information being stored in the registry 14. The application information acquisition unit 325 handles a process of acquiring information (application information) about the application 12, the information being stored in the registry 14.

The MQ related unit 33 executes a process in coordination with the MQ server 16. The MQ related unit 33 includes an MQ server connection unit 331, a queue name calculation unit 332, a queue generation unit 333, a message receiving unit 334 and a message transmitting unit 335.

The MQ server connection unit 331 executes a process related to establishing and disconnecting a session with the MQ server 16. The queue name calculation unit 332 executes a process of calculating a queue name, i.e., a name (identifier) of the queue equipped in the MQ server 16. The queue generation unit 333 handles a process for generating the queue Q in the MQ server 16.

The message receiving unit 334 handles a process of receiving the message transmitted from the MQ server 16. The message transmitting unit 335 handles a process of transmitting the message sent (written to the predetermined queue QA) to the MQ server 16. The control protocol processing unit 31 executes a process of issuing (generating) the control message to the subordinate switch 2 by use of the message received from the MQ server 16, and sending the control message to the switch 2.

<<Application>>

The application 12 receives a message (indicating, e.g., the occurrence of the event in a certain switch 2) from the controller 11 via the MQ server 16. Then, the application 12 executes processes (such as the path calculation, the topology discovery and the QoS control) based on the control logic 43 peculiar to the application 12 itself in accordance with a content of the received message.

Furthermore, the application 12 transmits the message to the controller 11 via the MQ server 16 when performing the control of the switch 2 as a processing result of the peculiar control logic 43. Moreover, the application 12 transfers and receives the message to and from the MQ server 16.

Figure 15:
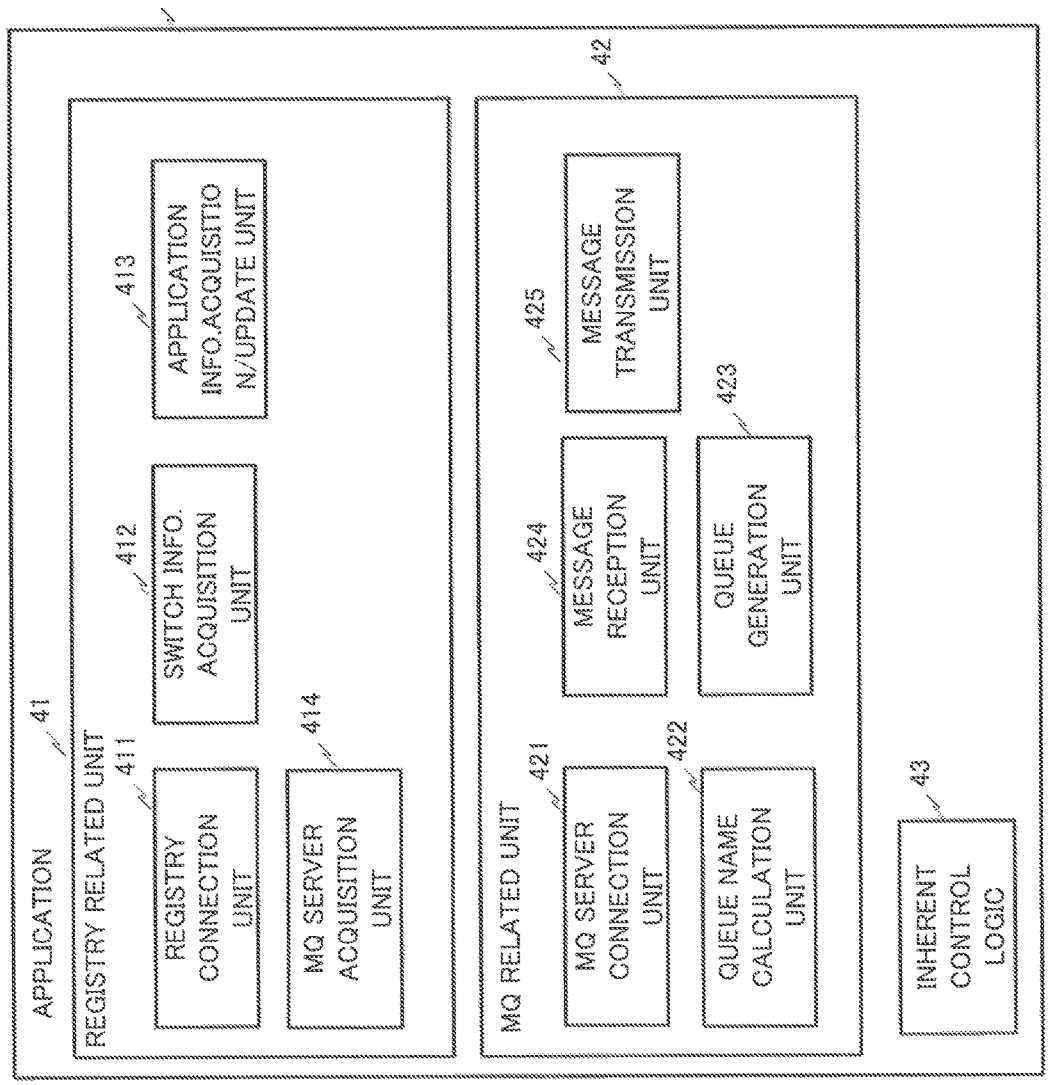
FIG. 15 illustrates an example of a configuration of the application.

FIG. 15 is a diagram illustrating an example of a configuration of the application. The application 12 includes a registry related unit 41, an MQ related unit 42 and the peculiar logic 43 described above. The registry related unit 41 includes a registry connection unit 411, a switch information acquisition unit 412, an application information acquisition/update unit 413 and an MQ server information acquisition unit 414.

The registry connection unit 411 handles a process of connecting the application 12 to the registry 14 in order to refer to and acquire the information stored in the registry 14. The switch information acquisition unit 412 handles a process of acquiring the information (the switch information) about the switch, the information being stored in the registry 14.

The application information acquisition/update unit 413 handles a process of acquiring and updating the information (the application information) about the application 12, the information being stored in the registry 14. The MQ server information acquisition unit 414 handles a process of acquiring the information (the MQ server information), the information being stored in the registry 14.

The MQ related unit 42 executes a process in coordination with the MQ server 16. The MQ related unit 42 includes an MQ server connection unit 421, a queue name calculation unit 422, a queue generation unit 423, a message receiving unit 424 and a message transmitting unit 425.

The MQ server connection unit 421 executes a process related to establishing and disconnecting the session with the MQ server 16. The queue name calculation unit 422 executes a process of calculating the queue name, i.e., the name (identifier) of the queue equipped in the MQ server 16. The queue generation unit 423 handles a process for generating the queue QA in the MQ server 16.

The message receiving unit 424 handles a process of receiving the message transmitted from the MQ server 16. The message transmitting unit 425 handles a process of transmitting the message that is sent (written to a predetermined queue Q) to the MQ server 16.

<<Registry>>

Figure 16:
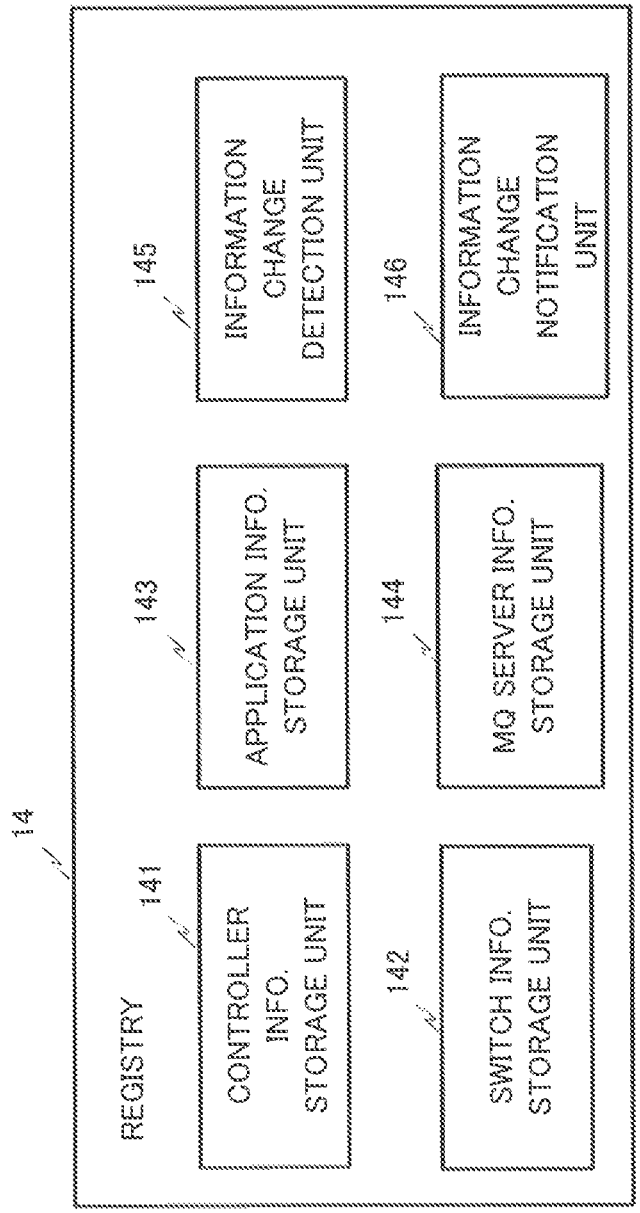
FIG. 16 illustrates an example of a structure of a registry.

FIG. 16 is a diagram illustrating an example of a configuration of the registry. The registry 14 stores the information about the controller 11, the application 12, the switch 2 and the MQ server 16. The registry 14 is generated on the memory 5. The registry 14 includes a controller information storage unit 141, a switch information storage unit 142, an application information storage unit 143, an MQ server information storage unit 144, an information change detecting unit 145 and an information change notifying unit 146.

FIG. 17 illustrates an example of a data structure of a table held by the controller information storage unit 141. The controller information storage unit 141 is stored with (retains) a list containing one or more records (entries), each generated per ID (controller identifier) of the controller 11 operating at the present, as the controller information.

The record is stored with (contains) a switch ID of the switch 2 (the subordinate switch 2) managed by the master controller and a switch ID of the switch 2 connected to the controller as a slave controller (with the session being established), these switch IDs being associated with the controller ID. Further, an error flag is managed in the way of being associated with each record (associated with the respective items of data registered in the fields of each record). When the failure of the controller 11 is detected, the error flag is set ON.

FIG. 18 illustrates an example of a data structure of a table held by the switch information storage unit 142. The switch information storage unit 142 retains a list (table) containing one or more records (entries), each generated per switch ID of the switch 2 connected to the controller 11. The record contains a controller ID of the master controller, a controller ID of the slave controller and an error flag, which are associated with the switch ID. The error flag is set ON when the failure occurs in the associated switch 2.

Figure 19:
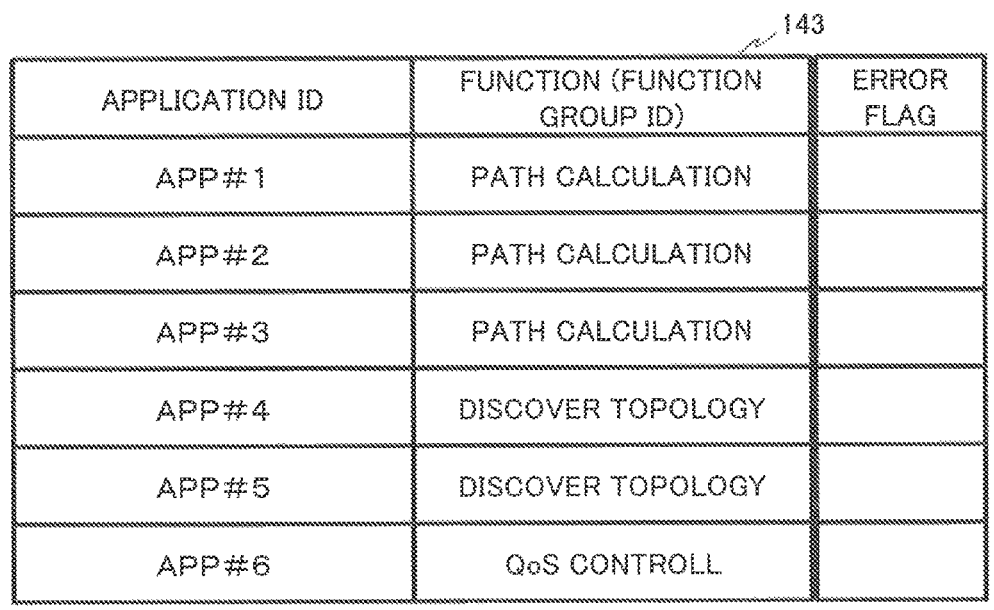
FIG. 19 illustrates an example of a data structure of a table held by An application information storage unit.

FIG. 19 illustrates an example of a data structure of a table held by the application information storage unit 143. The application information storage unit 143 retains an identifier (a function group ID) to specify a type of the application function (the application process group) provided by the application 12 having an application ID, and an error flag per ID (the application ID) of the application 12 operating at the present. The error flag is set ON when detecting a failure of the relevant application 12.

As described above, in the embodiment, each record contains the identifier (function group ID) of the application process group and the identifier (application ID) of the application process. The function group ID is the identifier to specify the application process group for providing a certain function, and is used as the identifier to specify the application function. The identifier of the application process is a unique identifier for distinguishing the application 12 from other applications.

FIG. 20 illustrates an example of a data structure of a table held by the MQ server information storage unit 144. The MQ server information storage unit 144 is stored with a list of an IP address and a port number of the MQ server 16 operating at the present, an associative rule between a switch ID and a queue name (a rule for associating the switch ID and the queue name with each other), an associative rule between an application function type (a function group ID) and the queue name (a rule for associating the function group ID and the queue name with each other), and an error flag. The error flag is set in the MQ server 16 with the occurrence of the failure (error).

The information change detecting unit 145 handles a process of detecting that the controller information, the switch information, the application information and the MQ server information each stored in the registry 14 have been changed. The information change notifying unit 146 handles a process of notifying the controller 11 and the application 12 of the information change detected by the information change detecting unit 145.

<<MQ Server>>

Figure 21:
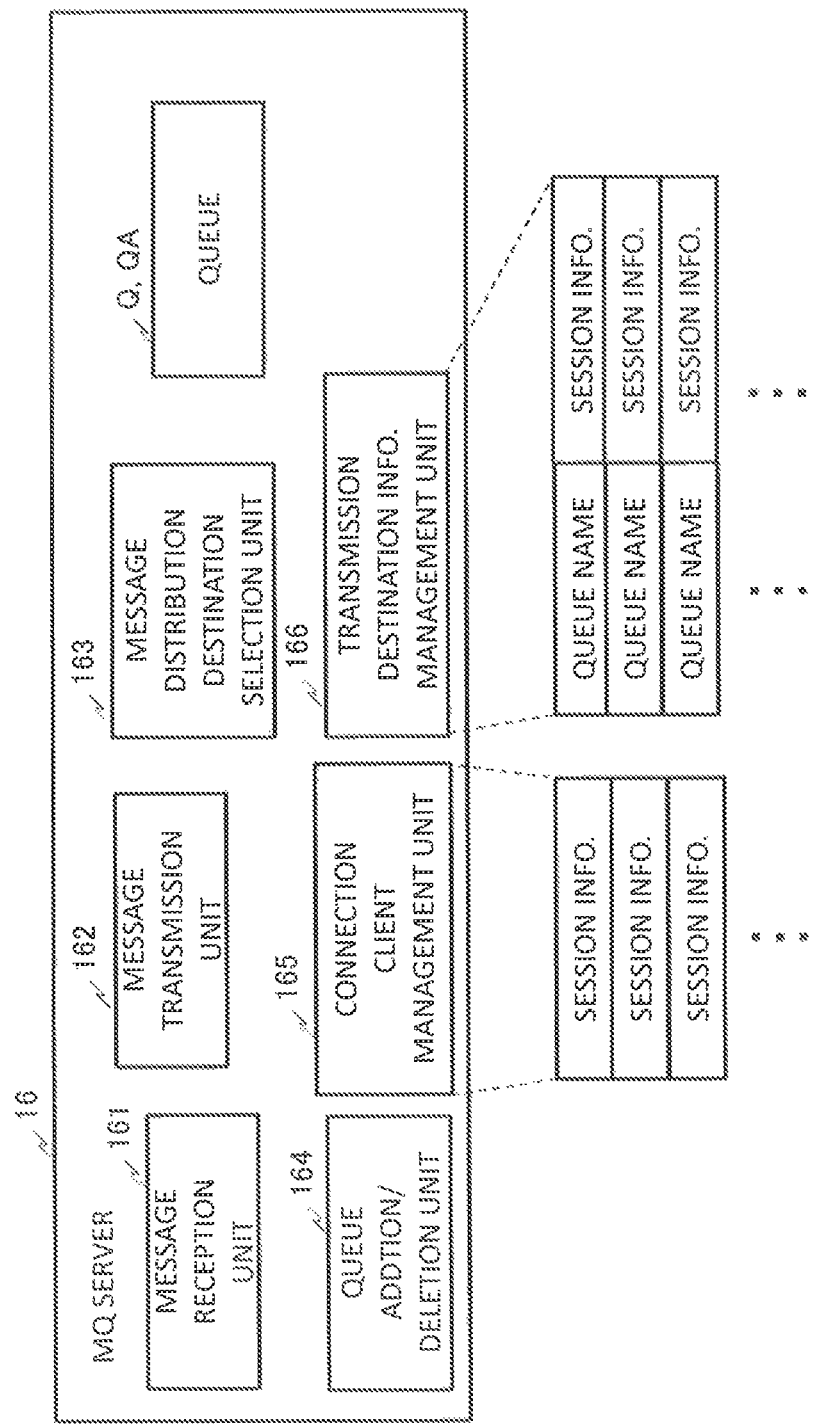
FIG. 21 is a diagram illustrating an example of a configuration of the MQ server.

FIG. 21 is a diagram illustrating an example of a configuration of the MQ server. The MQ server 16 is a kernel component of the messaging system 15. The MQ server 16 includes a message receiving unit 161, a message transmitting unit 162, a message distributed destination selecting unit 163 and a queue add/delete unit 164. The MQ server 16 further includes a connection client management unit 165, destination information (Subscribe Information) management unit 166 and a plurality of queues Q and QA.

The message receiving unit 161 handles a process of receiving the information from the controller 11 and the application 12 and writing the received information to the associated queue Q or QA. The message transmitting unit 162 handles a process of transmitting the information (the message) read from the head of the queue Q or QA to the destination (the controller 11, the application 12) on the basis of the destination information (the setting based on the destination information) stored in the destination information management unit 166. The message receiving unit 161 is one example of a receiving unit, and the message transmitting unit 162 is one example of a transmitting unit.

The message distributed destination selecting unit 163 handles a process of determining, when transmitting the message stored in the queue QA to any one of the plural applications 12, the destination application 12 according to a predetermined rule. The queue add/delete unit 164 adds or deletes the queue in response to a request given from the controller 11 or the application 12.

The connection client management unit 165 is stored with session information (an IP address, a port number, etc. of a client) about the client (the controller 11, the application 12) with which a present session is established.

The destination information management unit 166 is stored with the destination information indicating the destination of the message stored in each queue Q or QA. The destination information is defined as Subscribe information contained in a Subscribe command received by the message receiving unit 161 of the MQ server 16 from, e.g., the controller 11 or the application 12. The Subscribe information contains, e.g., the queue name and the session information (such as the IP address of the destination).

Herein, a description about Subscribe setting will be made. The Subscribe setting is setting contrived for the information (the message) stored in the queue Q (QA) designated by a consumer to reach the consumer (the controller, the application 12) through a Subscribe declaration.

Each of the controller 11 and the application 12, when desiring for the distribution of the information (the message) stored in a certain queue Q or QA, sends the Subscribe command (the Subscribe declaration) to the MQ server 16. The Subscribe command contains the Subscribe information described above.

The MQ server 16, upon receiving the Subscribe command, conducts connection setting for transmitting (the message stored in) the queue Q or QA having the queue name contained in the Subscribe information to an address (the destination) designated by the session information. The connection setting being done, the message read (pushed) from the head of the relevant queue Q (QA) is transmitted to the destination via the connection. Thus, the information (the message) stored in the queue Q or the queue QA is transmitted based on the destination information.

The Subscribe command is transferred and received when establishing the session between the MQ server 16 and the controller 11 (the application 12) or at proper timing after establishing the session. The Subscribe information in the Subscribe command corresponds to the destination information described above, and the queue name corresponds to the queue designating information. The session information corresponds to the destination designating information (the information for transmitting the information read from the designated queue to the controller 11 corresponding to the destination).

The MQ server 16 is equipped with one or more queues Q associated with the plurality of switches respectively and one or more queues QA each provided per application function (per function group ID) by way of the plurality of queues equipped in the MQ server 16.

Each queue Q is temporarily stored with the message addressed to the switch 2 associated with each queue Q, the message being transmitted from the application 12. The stored message is transferred (distributed) to the controller 11 (the master controller) controlling the switch 2 associated with each queue Q in accordance with the destination setting that uses the destination information.

Each queue QA is temporarily stored with the message related to the application function associated with each queue QA, the message being transmitted from the controller 11. The stored information is transferred to the application 12 that provides the application function associated with each queue QA in accordance with the destination setting that uses the destination information.

The information (the message) stored in the queue Q or QA contains the queue name (queue identifying information: write destination designating information) of the write destination. The MQ server 16, upon receiving the write target message, refers to the write destination information (the queue name) given to this message, and writes (stores) the received message to the queue Q or QA.

<Example of Operation>

Next, an example of an operation of the distributed controller will be described. The operations of the controller 11, the application 12 and the MQ server 16, which will hereinafter be described, are performed by the CPU 4 executing the program.

<<Start-UP Time of Controller>>

Figure 22:
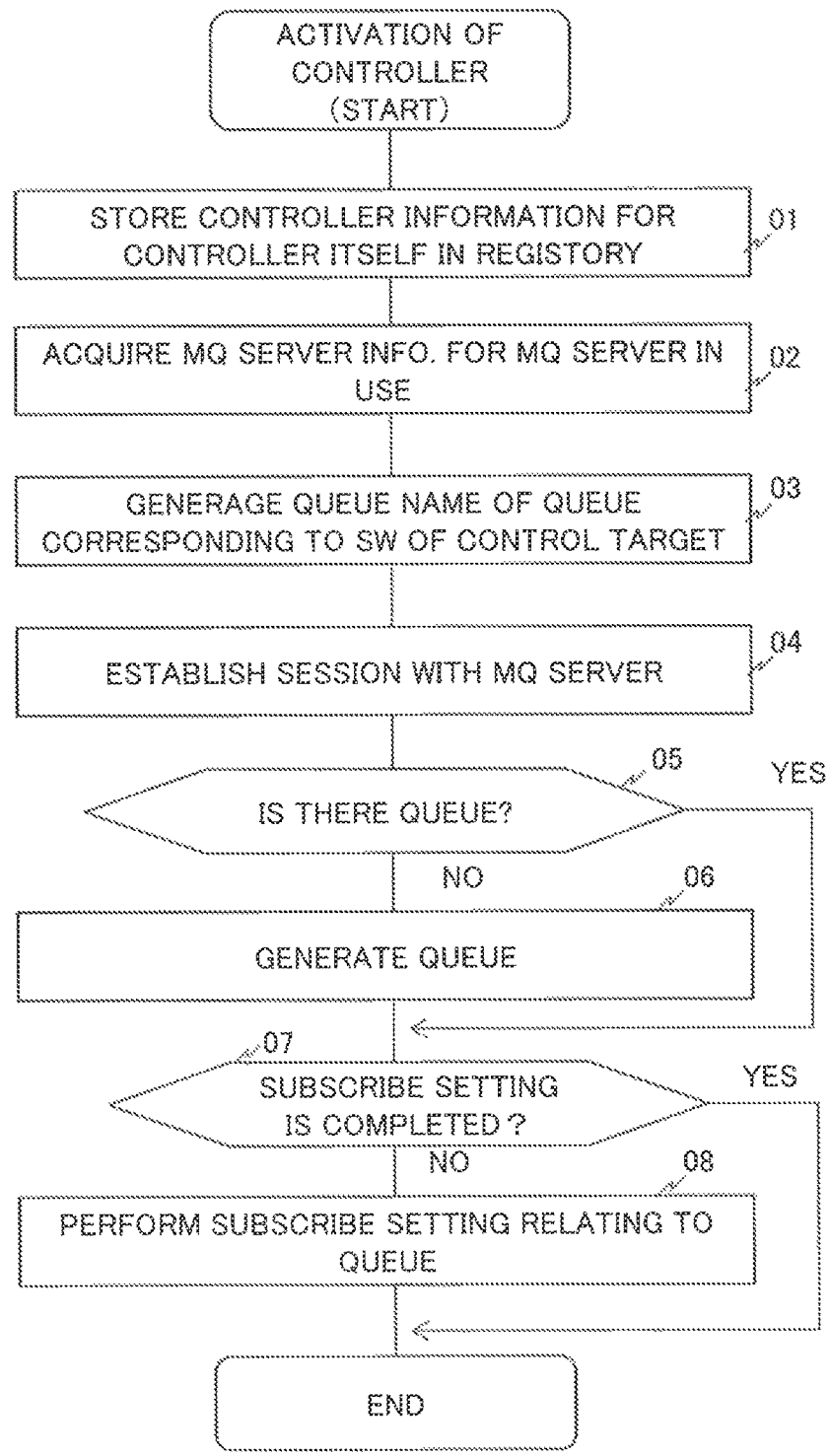
FIG. 22 is an explanatory flowchart illustrating an example of an operation of the controller when the controller starts up.

FIG. 22 is an explanatory flowchart of the example of the operation of the controller 11 when starting up the controller. When the controller 11 starts up in 01, a registry connection unit 321 establishes a connection with the registry 14. The controller information acquisition/update unit 322 of the controller 11 stores the controller information of the controller 11 in the controller information storage unit 141 of the registry 14.

Next, in 02, the MQ server information acquisition unit 324 of the controller 11 acquires the list of the IP address and the port number of the active MQ server 16 as the MQ server information from the MQ server information storage unit 144 of the registry 14.

Next, in 03, the MQ server information acquisition unit 324 of the controller 11 acquires the associative rule between the switch ID and the queue name from the MQ server information storage unit 144 of the registry 14. Subsequently, the switch information acquisition/update unit 323 of the controller 11 acquires the switch information stored in the switch information storage unit 142 of the registry 14. The queue name calculation unit 332 of the controller 11 generates an associated queue name from the switch ID of the switch 2 for which the controller 11 itself acts as the master controller by referring to the switch information and using the associative rule.

Next, in 04, the MQ server connection unit 331 of the controller 11 establishes the sessions with all the active MQ servers 16 by use of the IP addresses and the port numbers obtained in the process of 02.

Next, in 05, the controller 11 checks whether the queue having the queue name generated in 03 exists in the MQ server 16 or not. This check may involve querying the MQ server 16 and may also involve retaining an associative relationship between the queue name and the switch in the MQ server information of the registry 14 and referring to this associative relationship.

At this time, when the queue Q having the queue name generated in 03 does not exist in the MQ server 16 (05, NO), the queue generation unit 333 of the controller 11 requests the MQ server 16 to generate the queue Q having the generated queue name (06). The queue add/delete unit 164 of the MQ server 16 generates the queue Q in response to the request.

When the processing advances to 07, it is determined whether or not the Subscribe setting is completed with respect to the queue Q associated with the switch 2 controlled by the controller 11. When the Subscribe setting is not yet completed (07, NO), the controller 11 performs setting so that the message in the predetermined queue is transmitted to the controller 11 itself by sending the Subscribe command to the MQ server 16 (08). Upon finishing the Subscribe setting, the process at the start-up time is terminated. Note that an operation of the controller 11 at an increasing time of the controller 11 is treated equivalent to the operation when the controller starts up.

<<Termination of Controller>>

Figure 23:
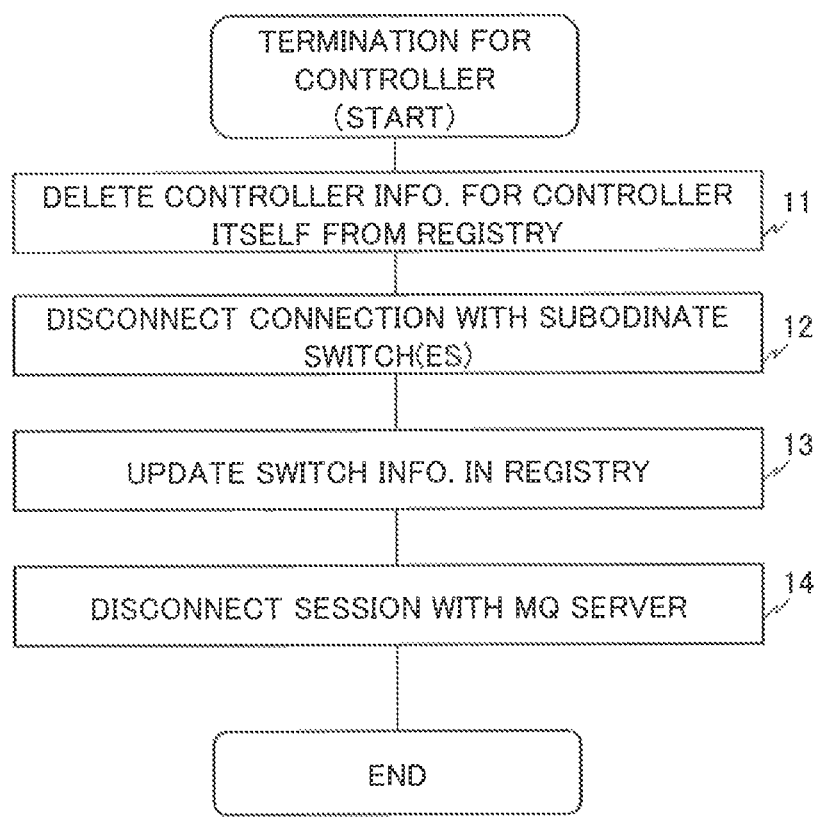
FIG. 23 is a flowchart illustrating an example of an operation when the controller comes to a termination.

Next, an operation of the controller 11 at a terminating time of the controller 11 will be described. FIG. 23 is a flowchart illustrating an example of the operation when the controller comes to the termination.

In 11, the registry connection unit 321 of the controller 11 establishes the connection with the registry 14, and the controller information acquisition/update unit 322 deletes the controller information of the controller 11 itself from the controller information storage unit 141 of the registry 14.

Next, in 12, the controller 11 disconnects the connections of all the subordinate switches 2. Subsequently in 13, the switch information acquisition/update unit 323 of the controller 11 updates switch information 142 in the registry 14 (rewrites the switch information into a content in which the disconnections from the switches 2 are reflected). Next in 14, the controller 11 disconnects the connections (the sessions) with all the MQ servers 16. Then, the process at the terminating time is finished.

<<Connection with Switch>>

Figure 24:
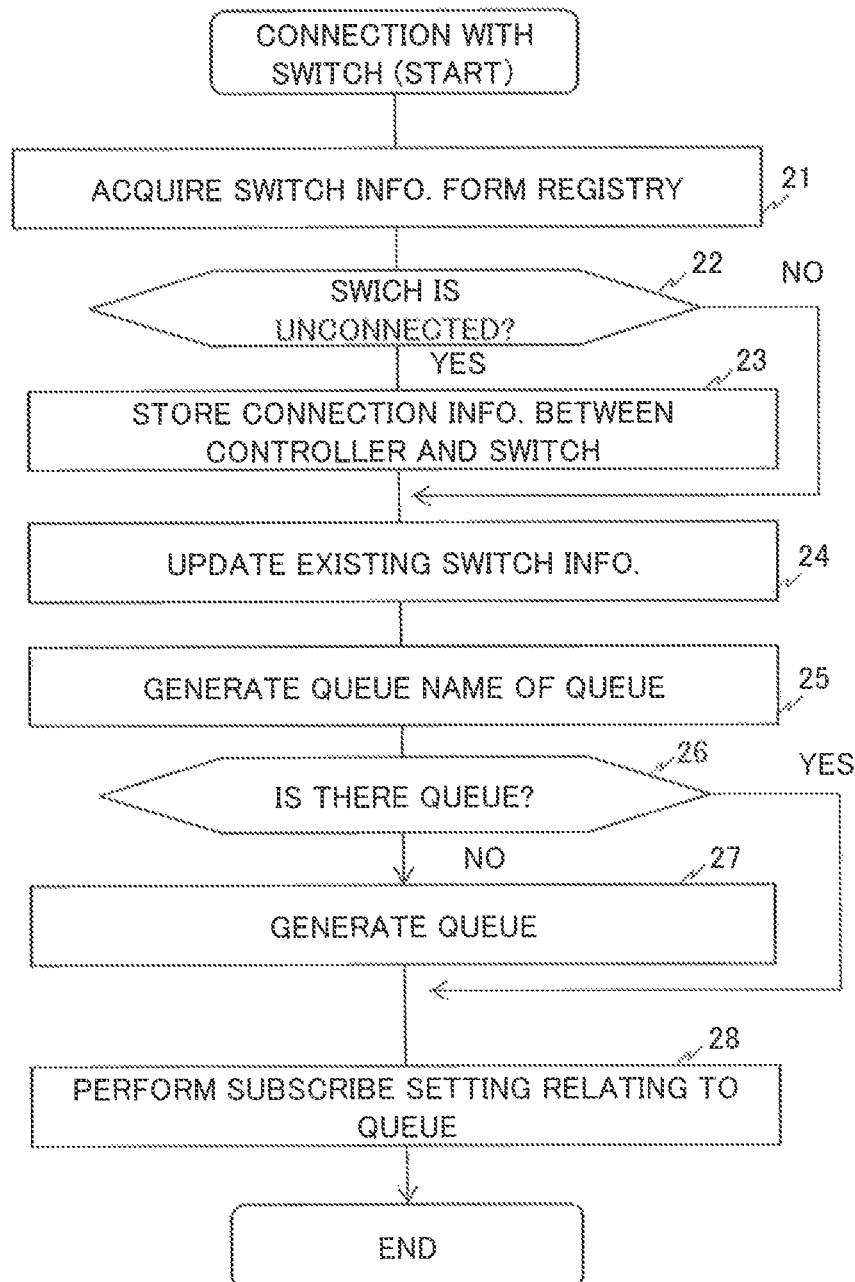
FIG. 24 is a flowchart illustrating an example of an operation of the controller when connecting with a switch.

Next, an example of an operation of the controller 11 when connected to the switch 2 will be described. FIG. 24 is a flowchart illustrating the example of the operation of the controller when connected to the switch.

Initially in 21, the registry connection unit 321 of the controller 11 connects to the registry 14, and the switch information acquisition/update unit 323 acquires the switch information (see FIG. 18) from the switch information storage unit 142 of the registry 14.

Next in 22, the switch information acquisition/update unit 323 of the controller 11 refers to the switch information and thus determines whether or not the connected switch 2 still remains unconnected to any controllers 11. When the switch is still unconnected (22, YES), the switch information indicating the connection between the controller itself and the switch 2 is stored in the switch information storage unit 142 of the registry 14 (23). Whereas when not unconnected (22, NO), the switch information acquisition/update unit 323 updates the existing switch information stored in the switch information storage unit 142 (24). Namely, the controller 11 writes information indicating that the connection with the switch 2 is changed to the controller 11 itself from another controller 11.

Next in 25, the queue name calculation unit 332 of the controller 11 generates the queue name from the switch ID of the connected switch 2 by using the method that has already been described. Subsequently in 26, the controller 11 checks whether the queue having the queue name generated in 25 exists in the MQ server 16 or not.

At this time, when the queue designated by the queue name does not exist in the MQ server 16 (26, NO), the queue generation unit 333 of the controller 11 requests all the active MQ servers 16 to generate the queue with the generated queue name (27). The queue add/delete unit 164 of the MQ server 16 generates the queue Q in response to the request.

Next in 28, the controller 11 performs the Subscribe setting for the generated queue Q. When the MQ server 16 receives the Subscribe command (Subscribe declaration) from the controller 11 with respect to one or more queues Q associated with the switches 2 controlled by the controller itself, the MQ server 16 is set to transmit the message read from the queue Q to the controller 11 making the declaration with respect to the message stored in the queue Q. Note that the process (Subscribe setting) in 28 is executed when the controller 11 becomes the master controller for the connected switch 2 but is not executed when connected as the slave.

<<Disconnecting Time from Switch>>

Figure 25:
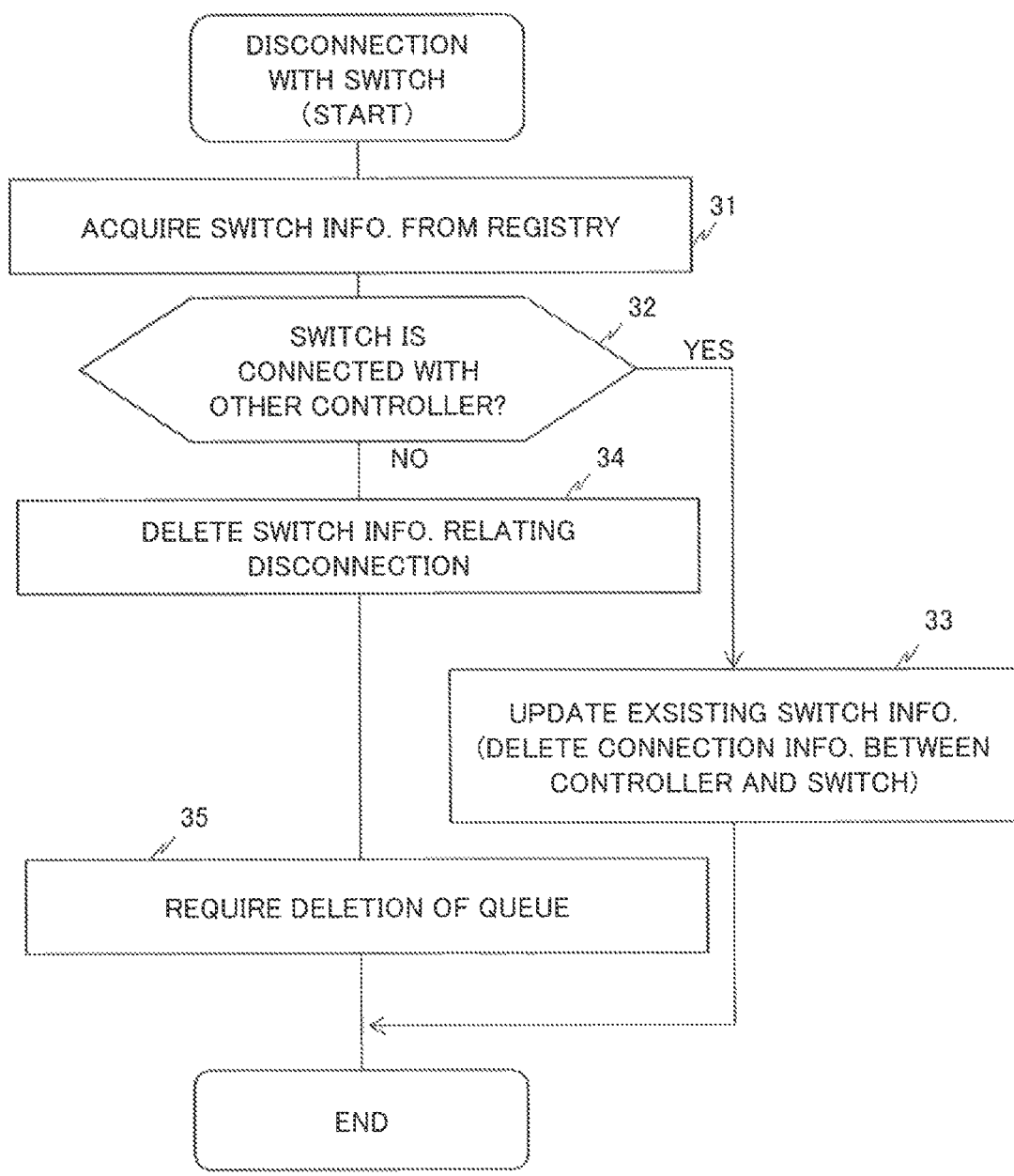
FIG. 25 is a flowchart illustrating an example of an operation of the controller when disconnected from the switch.

Next, an example of an operation of the controller when disconnected from the switch 2, will be described. FIG. 25 is a flowchart illustrating the example of the operation of the controller when disconnected from the switch 2.

Initially in 31, the registry connection unit 321 of the controller 11 establishes the connection with the registry 14, and the switch information acquisition/update unit 323 acquires the disconnection related switch information of the switch 2 from the switch information storage unit 142 of the registry 14.

Next in 32, the switch information acquisition/update unit 323 of the controller 11 refers to the switch information and thus determines whether the switch 2 is connected to another controller 11 or not. When connected to another controller 11 (32, YES), the existing switch information is updated in 33 (only the information about the connection between the controller itself and the switch 2 is deleted).

Whereas when the switch 2 is not connected to another controller 11 (when any controllers 11 connected to other switches do not exist) (32, NO), the switch information acquisition/update unit 323 deletes the switch information of this switch 2 (34). Further, the controller 11 requests each MQ server 16 to delete the queue Q associated with the switch (35). Each MQ server 16 deletes the relevant queue Q.

<<Activate (Start-Up) of Application>>

Figure 26:
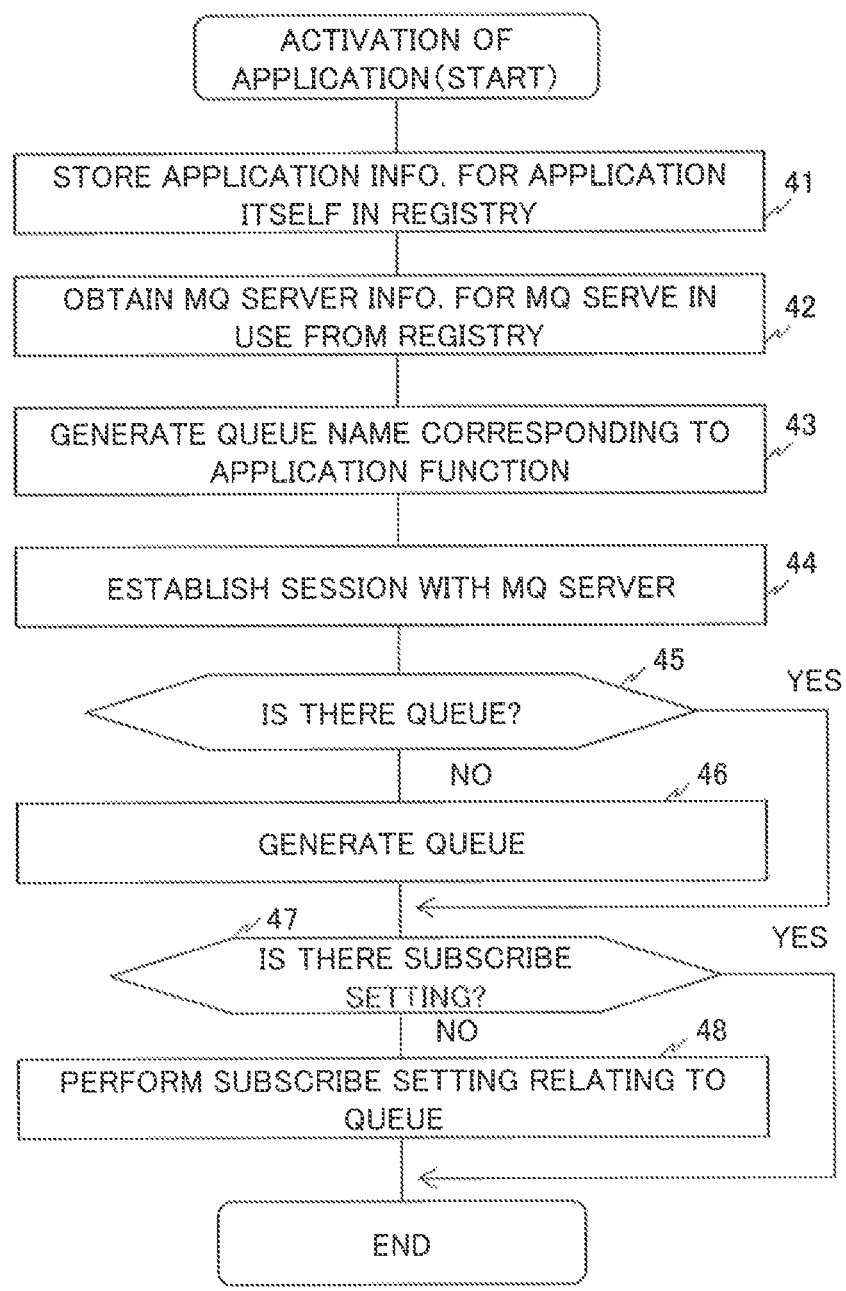
FIG. 26 is a flowchart illustrating an example of an operation of the application when the application starts up.

Next, an example of an operation of the application 12 when starting up the application 12 will be described. FIG. 26 is a flowchart illustrating the example of the operation of the application when starting up the application.

Initially in 41, the registry connection unit 411 of the application 12 establishes the connection with the registry 14, and the application information acquisition/update unit 413 stores application information of the application 12 itself in the application information storage unit 143.

Next in 42, the MQ server information acquisition unit 414 of the application 12 acquires the IP addresses and the port numbers of the active MQ servers 16 from the MQ server information storage unit 144 of the registry 14.

Subsequently in 43, the MQ server information acquisition unit 414 of the application 12 acquires the associative rule between the application function type (the function group ID) and the queue QA from the MQ server information storage unit 144 of the registry 14. The queue name calculation unit 422 generates the queue name associated with the application function type to which the application 12 itself belongs.

Next in 44, the MQ server connection unit 421 of the application 12 establishes the sessions with all the active MQ servers 16 by use of the IP addresses and the port numbers obtained in 42.

At this time, when queue Q having the queue name generated in 43 does not exist in the MQ server 16 (45, NO), the queue generation unit 423 of the application 12 requests the MQ server 16 to generate the queue having the generated queue name. The queue add/delete unit 164 of the MQ server 16 generates the queue QA in response to the request.

When the processing advances to 47, it is determined whether or not the Subscribe setting is completed with respect to the associated queue QA. When the Subscribe setting is not yet completed (47, NO), the application 12 performs setting so that the message in the predetermined queue QA is transmitted to the application 12 itself by sending the Subscribe command to the MQ server 16 (48). Upon finishing the Subscribe setting, the process at the start-up time is terminated. Note that an operation of the application 12 at an increasing time of the application 12 is treated equivalent to the operation described above when the application starts up.

<<Terminating of Application>>

Figure 27:
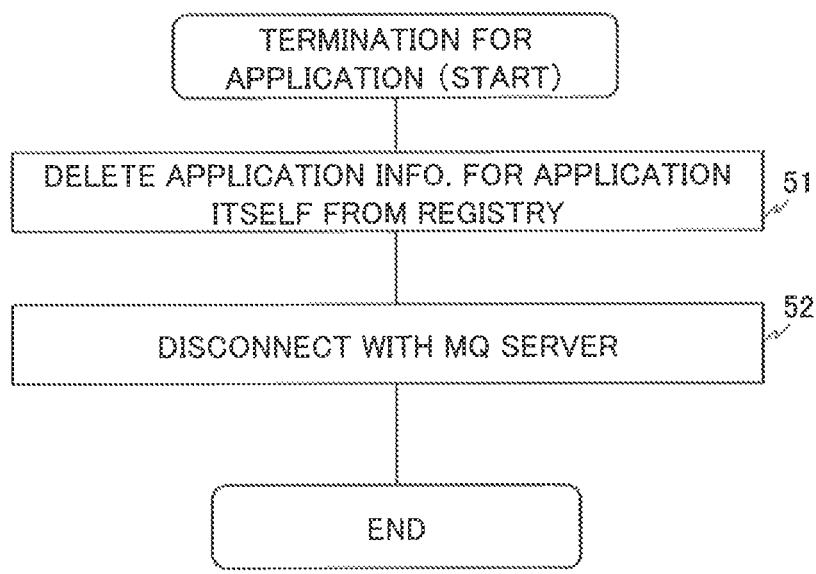
FIG. 27 is a flowchart illustrating an example of an operation of the application when the application finishes.

Next, an operation of the application 12 at a terminating time of the application 12 will be described. FIG. 27 is a flowchart illustrating an example of the operation of the application 12 when the application 12 comes to the termination.

In 51, the registry connection unit 411 of the application 12 establishes the connection with the registry 14, and the application information acquisition/update unit 413 deletes the application information of the application 12 itself from the application information storage unit 143 of the registry 14.

Next in 52, the application 12 disconnects the connections (the sessions) with all the MQ servers 16. Thereafter, the processes in FIG. 27 are finished.

<<Activate (Start-Up) of MQ Server>>

Figure 28:
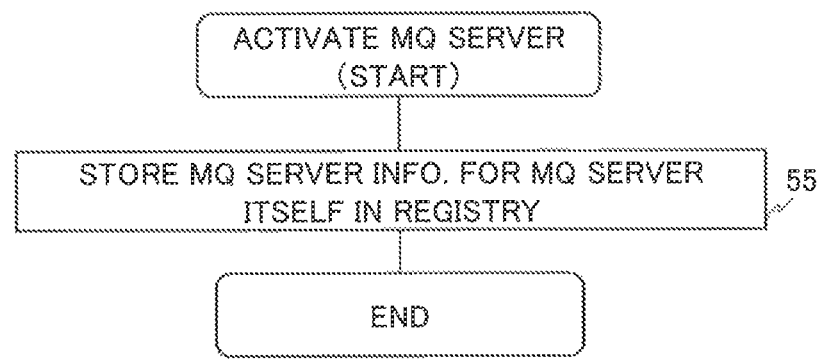
FIG. 28 is a flowchart illustrating an example of an operation of the MQ server when the MQ server starts up.

An example of an operation of the MQ server 16 when starting up the MQ server 16, will be described. FIG. 28 is a flowchart illustrating the operation of the MQ server 16 when starting up the MQ server 16. In 51, the MQ server 16 connects with the registry 14, and stores the self MQ server information in the MQ server information storage unit 144 of the registry 14.

<<Terminating Time of MQ Server>>

Figure 29:
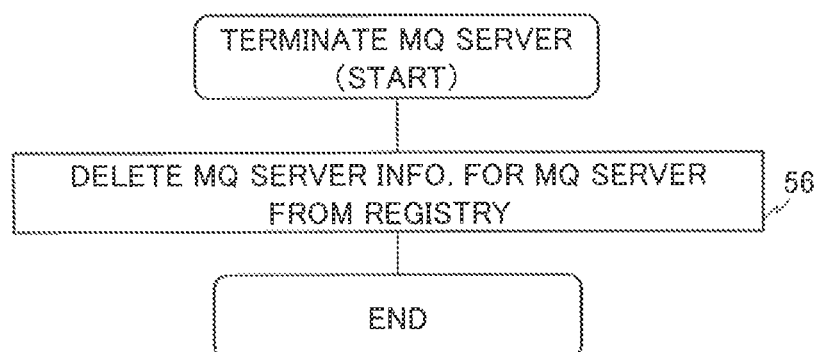
FIG. 29 is a flowchart illustrating an example of an operation of the MQ server when the MQ server finishes.

Next, an example of an operation of the MQ server 16 when the MQ server 16 comes to the termination, will be described. FIG. 29 is a flowchart illustrating the operation of the MQ server 16 when the MQ server 16 comes to the termination. In 56, the MQ server 16 connects with the registry 14 and deletes the self MQ server information from the MQ server information storage unit 144 of the registry 14.

<<Occurrence of Asynchronous Event of Switch>>

Figure 30:
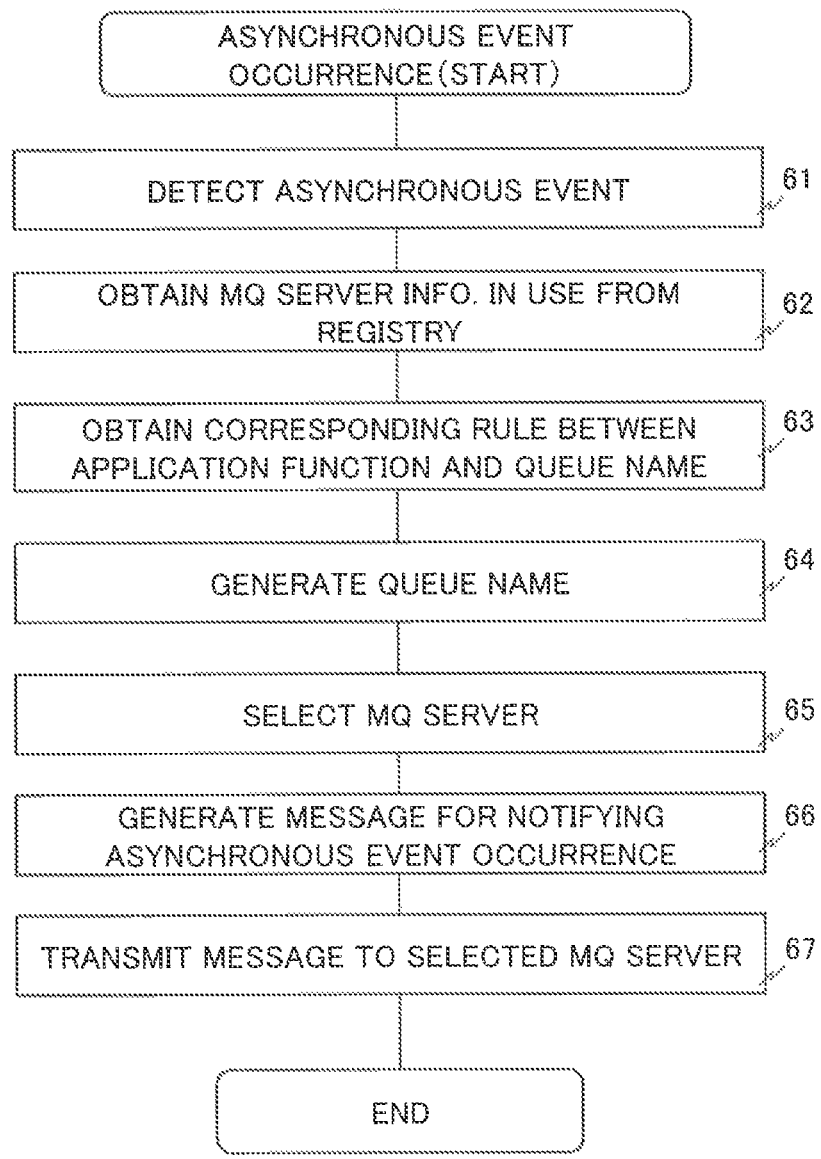
FIG. 30 is a flowchart illustrating an example of an operation of the controller when an asynchronous event occurs.

Described is an example of an operation of the controller (the master controller for a certain switch 2) when an asynchronous event occurs in a certain switch 2. FIG. 30 is a flowchart illustrating the example of the operation of the controller when the asynchronous event occurs.

In 61, the control protocol processing unit 31 of the controller 11 detects that the asynchronous event occurs in the switch 2. For example, the control protocol processing unit 31 receives notification indicating the occurrence of the event from the switch 2, and is thereby enabled to detect the occurrence of the event.

Next in 62, the registry connection unit 321 of the controller 11 connects with the registry 14. The MQ server information acquisition unit 324 acquires the MQ server information from the MQ server information storage unit 144, thereby obtaining the list of the IP addresses and the port numbers of the MQ servers 16.

Subsequently in 63, the MQ server information acquisition unit 324 acquires the associative rule between the application function type (the function group ID) and the queue name from the MQ server information storage unit 144 of the registry 14. Next in 64, the queue name calculation unit 332 of the controller 11 generates the queue name associated with the application function type (the function group ID) related to the asynchronous event by use of the associative rule obtained from the MQ server 16.

Next in 65, the controller 11 selects one MQ server 16 from the list of the IP addresses and the port numbers of the MQ servers 16, the list being acquired in 62. Subsequently in 66, the controller 11 creates a message for notifying the application 12 providing the corresponding application function that the asynchronous event occurs. Then, in 67, the message transmitting unit 425 transmits the message created in 66 to the MQ server 16 selected in 65. The message is stored in the queue QA (associated with the application function related to the asynchronous event) provided in the MQ server 16 on the basis of the queue name attached to the message.

<<Message Reception from MQ Server (at Controller)>>

Figure 31:
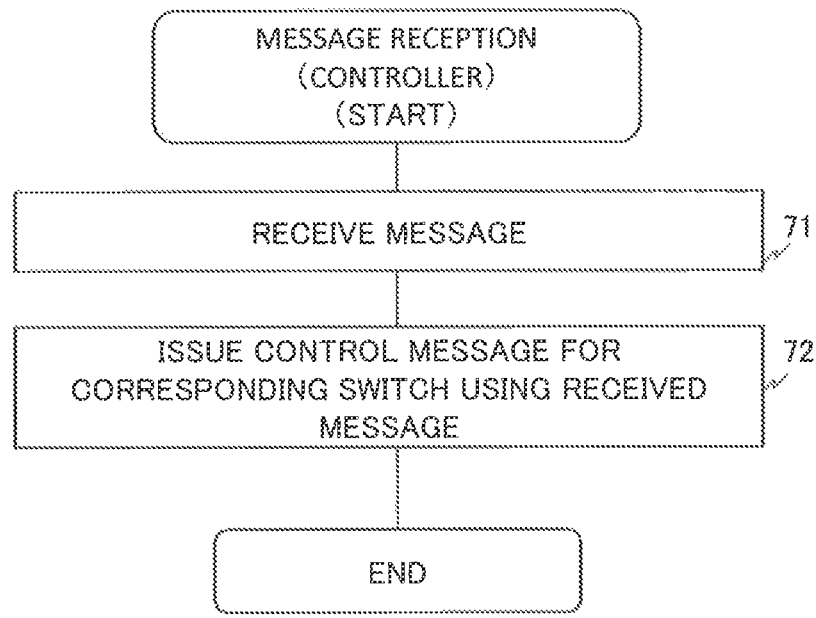
FIG. 31 is a flowchart illustrating an example of an operation of the controller receiving a message from the MQ server.

Next, an example of an operation of the controller 11 when receiving the message from the MQ server 16, will be described. FIG. 31 is a flowchart illustrating the example of the operation of the controller 11 receiving the message from the MQ server 16.

In 71, the message receiving unit 334 receives the message transmitted from the MQ server 16. Thereupon, the control protocol processing unit 31 issues the control message to the switch 2 associated with the queue Q stored with the received message so far (72). The control message is sent to the relevant switch 2.

<<Message Reception from MQ Server (at Application)>>

Figure 32:
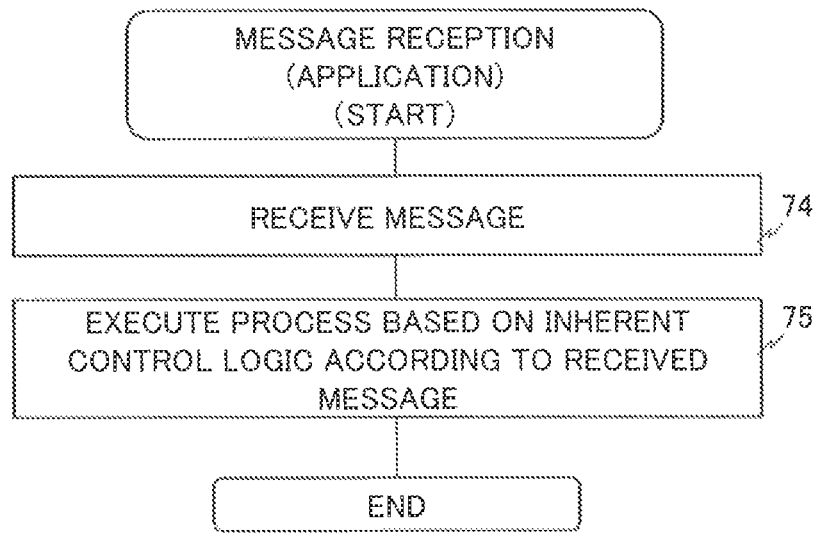
FIG. 32 is a flowchart illustrating an example of an operation of the application receiving the message from the MQ server.

Next, an example of an operation of the application 12 when receiving the message from the MQ server 16, will be described. FIG. 32 is a flowchart illustrating the example of the operation of the application that receives the message from the MQ server.

In 74, the message receiving unit 424 receives the message transmitted from the MQ server 16. Thereupon, in 75, the application 12 interprets a content of the received message and executes, based on a result of the interpretation, a process corresponding to the peculiar control logic 43.

<<Example of Operation when Controlling Switch from Application>>

Figure 33:
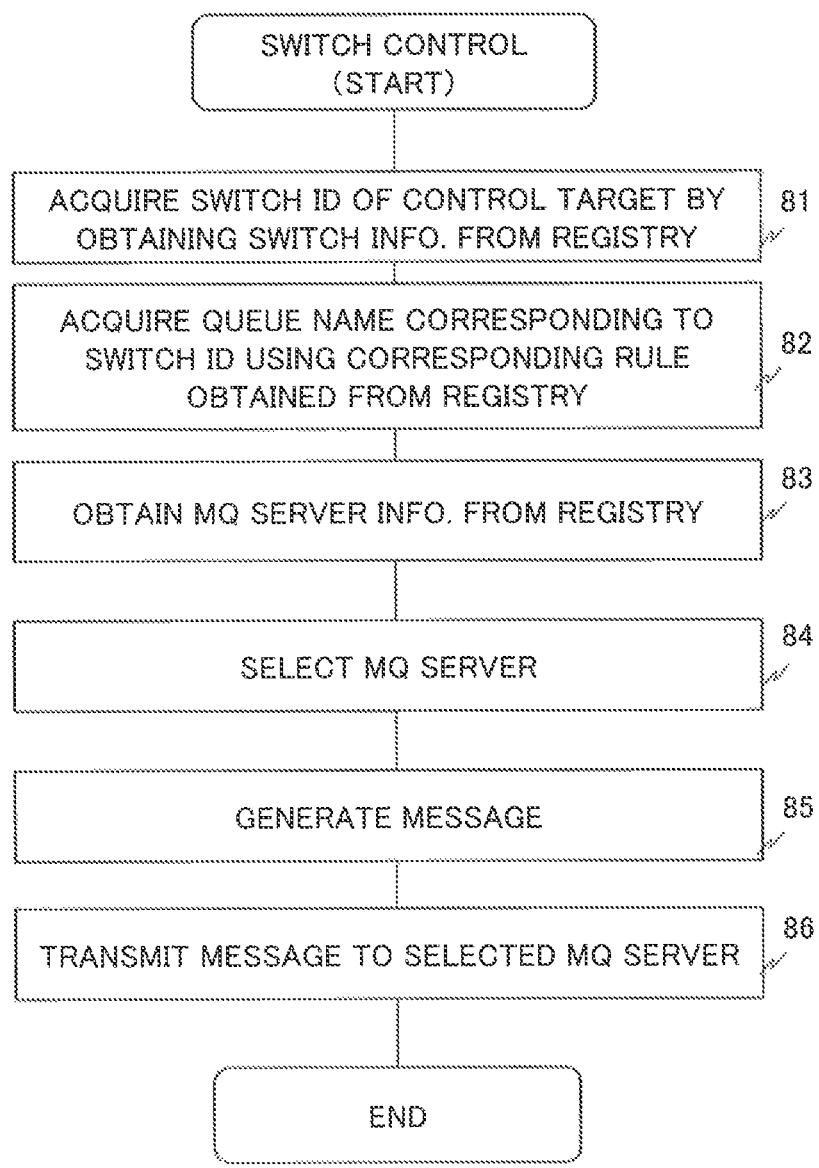
FIG. 33 is a flowchart illustrating an example of an operation of the application when the application controls a certain switch.

FIG. 33 is a flowchart illustrating an example of an operation of the application 12 when the application 12 controls a certain switch 2.

Initially in 81, the registry connection unit 411 of the application 12 executes a process of connecting with the registry 14, and the switch information acquisition unit 412 determines a switch ID of the switch 2 to be controlled in a way that uses the switch information obtained from the switch information storage unit 142.

Next in 82, the MQ server information acquisition unit 414 of the application 12 acquires the associative rule between the switch ID and the queue from the MQ server information storage unit 144 of the registry 14, and the queue name calculation unit 422 obtains the queue name associated with the switch ID of the control target switch 2.

Subsequently in 83, the MQ server information acquisition unit 414 of the application 12 acquires the MQ server information from the MQ server information storage unit 144, thus obtaining the list of the IP addresses and the port numbers of the MQ servers 16.

Next in 84, the application 12 selects one MQ server 16 from the list of the IP addresses and the port numbers of the MQ servers 16, the list being acquired in 83. Subsequently in 85, the application 12 creates the message for controlling the switch 2.

Next in 86, the application 12 transmits the created message to the selected MQ server 16. The message contains the queue name, and the MQ server 16 stores the received message in the queue Q having (designated by) the queue name.

<Operation when Number of Controllers Varies>

Next, an example of an operation when the number of the controllers 11 increases or decreases, will be described.

<<Increase of Controller>>

Figure 34:
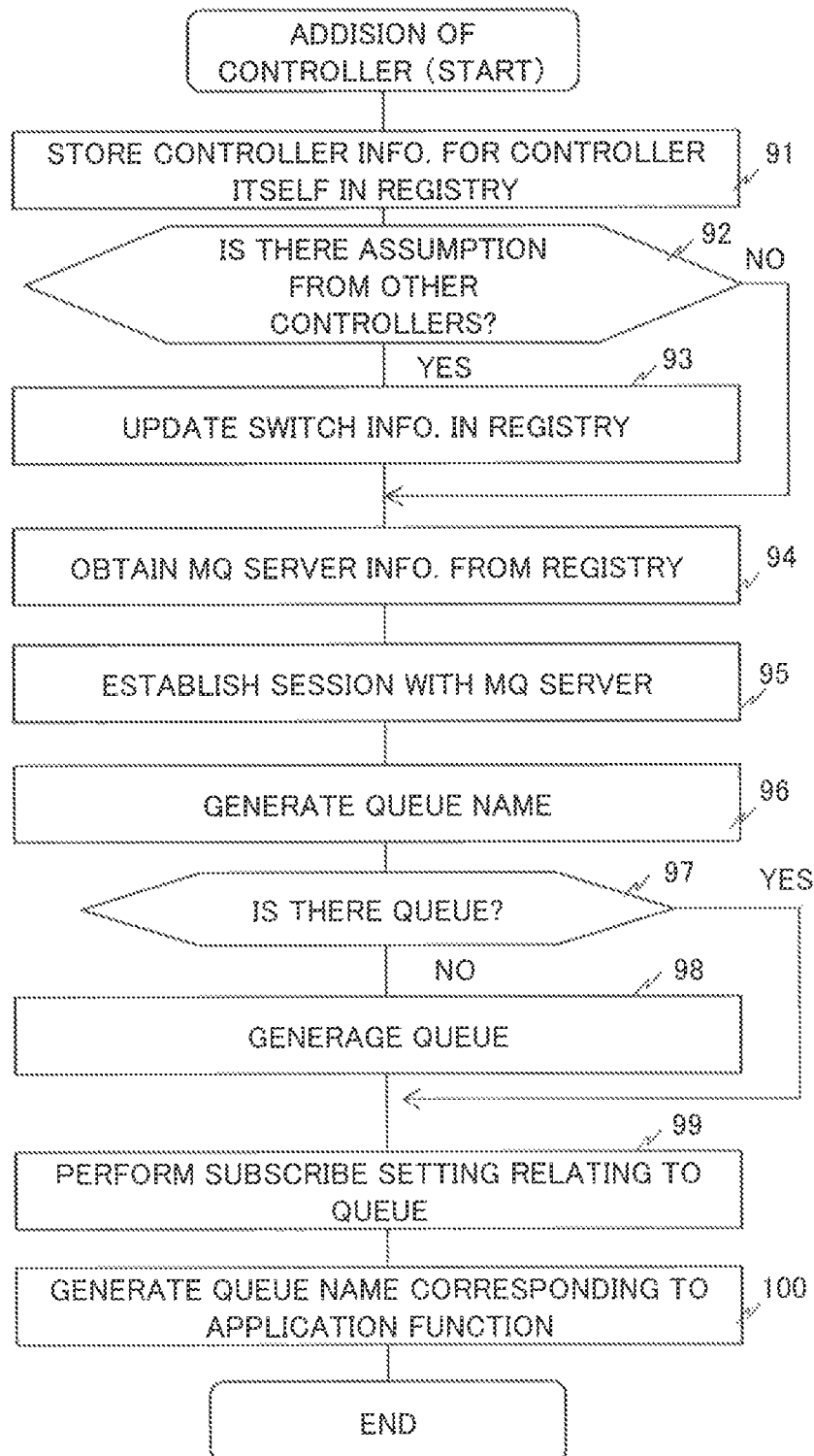
FIG. 34 is a flowchart illustrating an example of an operation when the number of the controllers increases.

An example of an operation when the number of the controllers 11 increases due to an addition of the new controller 11, will hereinafter be described. The operation when added has a portion (process) overlapped with the operation when starting up the controller 11. FIG. 34 is a flowchart illustrating the example of the operation when the number of the controllers increases.

Initially in 91, the registry connection unit 321 of the controller 11 related to the addition connects with (accesses) the registry 14, and stores (adds) the controller information (such as the controller ID) of the controller 11 itself in the controller information storage unit 141 of the registry 14.

Next in 92, it is determined whether or not the controller 11 related to the addition takes over the control of a certain switch 2 from the existing controller 11. At this time, when the controller 11 related to the addition takes over the control of the certain switch 2 from the existing controller 11 (which means becoming the master controller for the certain switch 2) (92, YES), the processing advances to 93 but diverts to 94 whereas when not (92, NO).

When the processing advances to 93, the switch information acquisition/update unit 323 of the controller 11 accesses the switch information storage unit 142 of the registry 14, and thus updates information about the master controller for a certain switch 2. To be specific, the information is stored, which indicates that the master controller for the certain switch is the controller 11 itself and that the existing controller 11 is the slave controller for the certain switch 2. Thereafter, the processing advances to 94.

When the processing advances to 94, the MQ server information acquisition unit 324 of the controller 11 related to the addition acquires the MQ server information from the MQ server information storage unit 144 of the registry 14, thereby obtaining the list of the IP addresses and the port numbers of the MQ servers 16 as the connecting destinations.

Next in 95, the controller 11 related to the addition establishes the sessions with the respective MQ servers 16 by using the list of the IP addresses and the port numbers of the MQ servers 16, the list being acquired in 94. Subsequently in 96, the queue name calculation unit 332 of the controller 11 generates the queue name by use of the switch ID of the switch 2 controlled by the controller 11 as the master controller and the associative rule between the switch ID and the queue name, the rule being obtained from the registry 14. At this time, the queue names for the respective switches 2 are generated when the controller 11 controls the plurality of switches 2.

Next in 97, it is determined whether or not any queue Q having the queue name generated in 96 exists in the MQ server 16. At this time, when the queue Q having the queue name generated in the procedure 3 does not exist in the MQ server 16 (97, NO), the queue generation unit 333 of the controller 11 requests the MQ server 16 to generate the queue designated by the generated queue name (98). The queue add/delete unit 164 of the MQ server 16 generates the queue Q in response to the request.

Next in 99, the controller 11 subscribes (Subscribe) the message to be stored in the queue Q having the generated queue name. Namely, the controller 11 generates the Subscribe command containing the subscribe information (Subscribe information), and sends the subscribe information to the MQ server 16. The Subscribe information contains the queue name with a desire for subscribing the message and the destination information (e.g., the session information between the controller 11 and the MQ server 16) of the message.

The MQ server 16, upon receiving the Subscribe command, stores the Subscribe information contained in this command in the Subscribe information management unit 166, the Subscribe information serving as the destination information of the message to be stored in the queue Q. The MQ server 16 and the controller 11 perform the setting for the connection to transmit the message being read from the head of the relevant queue Q to the controller 11. With the connection setting, when the message is read from the head of the queue Q, this message is transmitted to the destination controller 11 via the preset connection.

Thus, in the embodiment, the controller 11 sends the Subscribe command (Subscribe information: one example of the destination information) to the MQ server 16, and the connection based on the Subscribe information is set. After the connection setting, the message is thereby transmitted to the destination controller 11 (implementing the Subscribe declaration) without making the determinations about the individual addresses (destinations) of the messages being read from the queue Q.

Next in 100, the application information acquisition unit 325 of the controller 11 related to the addition acquires the identifying information (the function group ID) of the application process group (the application function) stored in the application information storage unit 143 of the registry 14, and the queue name calculation unit 332 generates the queue name associated with the application function. This queue name is the queue name of the queue QA stored with the messages addressed to the application 12 provided in the MQ server 16, and is used when sending the message addressed to the application 12 to the associated application 12 via the MQ server 16.

[Process Related to Update of Information in Registry]

As stated above, in the registry 14, when the items of information stored in the controller information storage unit 141, the switch information storage unit 142, the application information storage unit 143 and the MQ server information storage unit 144 are updated (changed), the information change detecting unit 145 detects the changes thereof. Thereupon, the information change notifying unit 146 notifies the respective controllers 11 that the items of information have been changed.

Typically, a predetermined monitoring function monitors the operations and the processes of the switch 2, the controller 11, the application 12 and the MQ server 16. When the failure (error) occurs in any of these components, the error flag of a corresponding field in the registry 14 is set ON. The flag-ON of the error flag is detected as an update of the information by the information change detecting unit 145, and the predetermined notifying destination (such as the controller 11) is notified of this update (the occurrence of the error in the predetermined portion). Thus, each controller 11 can detect the change of the information stored in the registry 14, and conducts the following operation in accordance with the content of t the change (update).

[[Updated Case of Information of Switch Managed by Self Controller as Master Controller]]

(1) Decreasing Time of Switch Count

The controller 11, when notified of the update of the switch information, refers to the switch information stored in the switch information storage unit 142 of the registry. At this time, the controller 11 performs the following operation when the switch information of the switch for which the controller itself acts as the master controller is deleted or when the error flag is set (the number of the switches 2 decreases).

Namely, the controller 11 transmits, to the MQ server 16, a command for canceling the Subscribe setting for the queue Q associated with the switch 2 related to the decrease. The transmission of the message from the relevant queue Q is thereby stopped.

(2) Increase of Switch Count

When the number of the switches 2 increases due to the update of the switch information and when the controller itself is set as the master controller for the relevant switch 2, the controller 11 performs the Subscribe setting for the queue Q associated with the switch 2 related to the increase. The controller 11 is thereby enabled to receive the message being read and transmitted from the queue Q.

[[Decreased Case of Number of Active MQ Servers]]

When the MQ server information in the registry 14 is updated due to the decrease in number of the active MQ servers 16 (e.g., the deletion of the MQ server 16), the controller 11 disconnects the session with the MQ server related to the decrease.

[[Increased Case of Number of Active MQ Servers]]

When the MQ server information in the registry 14 is updated due to the increase in number of the active MQ servers 16, the controller 11 executes a process of connecting with each MQ server 16 related to the increase by use of the MQ server information, thus establishing the session with each MQ server 16. With this connection, the messages can be received in parallel from the plurality of MQ servers 16.

[[Increase/Decrease of Application]]

When the application information of the registry 14 is updated due to the increase or decrease of the application process groups (the application functions), the controller 11 updates the queue names associated with the application process groups (the function group IDs) retained within the controller 11 by using the application information.

Namely, each controller 11 retains the queue name associated with the function group ID of the message destination in order to transmit the message (to accumulate the message in the queue QA) addressed to the application 12 from the controller 11. When the application function increases (when the queue QA increases), the controller 11 obtains and adds the queue name of the queue QA related to the increase to the queue name (the destination information in the message) of the queue QA retained within the controller 11. When the application function decreases (when the queue QA is deleted), the controller 11 deletes the queue name concerned.

[[Reception Time of Event Notification from Subordinate Switch]]

Further, the controller 11, when notified of the event from the switch 2 managed by the controller 11 itself as the master controller, operates as follows. To be specific, the controller 11 selects one of the established sessions with the plurality of MQ servers 16. The controller 11 writes the message indicating that the event occurs from the switch 2 to the queue QA with its queue name being retained within the controller 11 via the selected session.

Further, the controller 11, when receiving the message from the queue Q subscribed by the controller 11 itself, operates as below. To be specific, in accordance with the content of the received message, the control protocol processing unit 31 issues the control message corresponding to the content of the received message, and sends this control message to the relevant switch 2.

<<Decreasing of Controller>>

Next, an example of an operation when the controllers 11 decrease due to the failure etc., will be described. FIG. 35 is a flowchart illustrating the example of the operation when the controllers 11 decrease due to the failure etc. The following discussion on the example of the operation assumes a relationship between the controllers #1-#3, the switches #1-#6 and the MQ server 16 illustrated in FIG. 8.

When the failure occurs in one (the controller #3) of the plural controllers 11, the information indicating the failure of the controller #3 is written to the registry 14 by the predetermined monitoring function. Specifically, the error flag about the controller #3 is set in the controller information storage unit 141 (containing the contents illustrated in FIG. 17) of the registry 14.

The setting of the error flag such as this is detected as the change of the controller information by the information change detecting unit 145. The information change notifying unit 146 notifies the remaining controllers 11 (the controllers #1 and #2) that the controller information has been changed.

In 111, each of the controllers #1 and #2, upon receiving the notification of the change of the controller information, connects with the registry 14, thereby referring to the contents (FIG. 17) of the controller information storage unit 141. Each of the controllers #1 and #2 is thereby enabled to detect the failure of the controller #3 by referring to the error flag set in the controller #3 (132).

Next, each of the controllers #1 and #2 determines whether or not the controller itself needs to take over the switch control conducted so far by the controller #3 (113). When needing to take over the control (113, YES), the processing advances to 114 but comes to end in FIG. 35 whereas when not.

To be specific, through making the reference to the controller information storage unit 141 (FIG. 17), because of the controller #1 (the controller itself) not being slave-connected to the switch #6 controlled so far by the controller #3 as the master controller, the controller #1 determines that there is no necessity for taking over the control, and the processing is terminated.

By contrast, through making the reference to the controller information storage unit 141 (FIG. 17), because of the controller #2 (the controller itself) being slave-connected to the switch #6 controlled so far by the controller #3 as the master controller, the controller #2 determines that there is the necessity for the takeover.

Note that this example discusses the instance in which the controller 11 being slave-connected to the takeover target switch 2 is only the controller #2. It is supposed that there is the plurality of controllers 11 being slave-connected to the switch, in which case the controller 11 to take over the master setting is determined based on a predetermined priority order and through negotiations between or among the controllers 11.

The controller #2, next in 114, updates the contents of the controller information storage unit 141 of the registry 14. For example, in the record of the controller #2 in the controller information storage unit 141, the switch #6 is added to the "Master" field but is deleted from the "Slave" field.

Further, the controller #2 deletes the switch #6 from the "Master" field of the record relating to the controller #3. Moreover, the controller #2 refers to the switch information storage unit 142 (see FIG. 18), and updates the record of the switch #6 by changing the value (CNT#3) to "CNT#2" in the "Master" field and deleting "CNT#2" from the "Slave" field of this record.

Next in 115, the controller #2 performs the Subscribe setting for the MQ server 16 with respect to the queue Q associated with the switch #6. The message addressed to the switch #6 is thereby sent to the controller #2 from the MQ server 16.

Next in 116, the controller #2 generates the queue name associated with the application function by the same method as the method described so far (100 in FIG. 34). With this contrivance, the controller #2 can deduce, when receiving the notification of the occurrence of the event from the switch #6, the queue name associated with the application function corresponding to this event. However, this process may also be executed when actually receiving the notification of the occurrence of the event from the switch #6.

As described above, the controller 11 can be flexible to the increase or decrease in the number of the controllers 11 by increasing or decreasing the queues with the Subscribe setting being done in a way that synchronizes with the switch information stored in the registry 14.

Note that the process in 94 and the process in 95 illustrated in FIG. 34 may be reversed in terms of processing order. Moreover, the process in 03 and the process in 04 illustrated in FIG. 22 may also be reversed in terms of processing order.

<Operation at Varying Time of Number of Application Processes>

<<Increase of Application>>

An operation flow of the application 12 when the number of the application processes (the applications 12) increases, is substantially the same as the operation (FIG. 26) when the application 12 starts up. Hence the description thereof is omitted.

The application 12 can perform the following operation by receiving the notification of the change of the information in the registry 14.

[[Reception of Information Change Notification of Switch Information]]

The application 12, upon receiving the information change notification of the switch information, acquires the switch information from the registry 14. At this time, when the number of the switches 2 increases or decrease, the application 12 executes a process of updating the queue names retained by the application 12 itself for the transmission to the MQ server 16. Namely, when a certain switch 2 is deleted, the application 12 deletes the queue name associated with this switch 2. Whereas when a certain switch 2 is added, the queue name is generated from the switch ID related to the addition and is retained by the method described so far.

[[Increase or Decrease of MQ Servers]]

When the number of the active MQ servers 16 decreases (when a certain MQ server 16 is deleted), the application 12 disconnects the session with the MQ server 16. Whereas when the number of the MQ servers 16 increases, the application 12 connects with the MQ server 16, thus establishing the session therewith.

[[Reception Time of Message from Queue, Switch Control Time]]

The application 12, when receiving the message from the subscribed queue QA, conducts the operation illustrated in FIG. 32. Further, the application 12 executes the process depicted in FIG. 33 when desiring to control a certain switch 2.

<<Decreasing Time of Applications>>

Next, an example of an operation when the number of the applications 12 decreases, will be described. When one of the plural applications 12 disappears through the termination or the deletion, the session between the application 12 and the MQ server 16 is disconnected. With this disconnection, the MQ server 16 does not distribute the message to the relevant application.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A server provided in a network system in which a plurality of controllers control a plurality of switches based on information given from an application, the server comprising:

a plurality of queues, each of which corresponds to the plurality of switches one to one, configured to store information given from the application directed to the corresponding switch;

a receiver configured to receive, from each of the controllers, transmission destination information including queue designating information and information for transmitting information read from the queue designated by the queue designating information to one of the plurality of controllers being a transmission destination of the read information, wherein the queue designating information designates each queue corresponding to one or more switches controlled by each of the plurality of controllers; and a transmitter configured to transmit the information read from each of the plurality of queues to one of the plurality of controllers controlling at least one of the plurality of switches corresponding to each of the plurality of queues based on the transmission destination information, wherein each of the plurality of switches is any one of a router and a layer 3 switch or any one of a layer 2 switch and a switching HUB, and wherein the receiver receives, when the controller to control at least one of the plurality of switches is changed due to a decrease or an increase of count of the plurality of controllers, the destination information from at least one controller to control at least one of the plurality of switches based on the change, and the transmitter transmits, to the at least one controller, information read from the queue corresponding to the at least one of the plurality of switches based on the destination information received from the at least one controller.

* * * * *